US010658664B2

(12) United States Patent
Wohlfahrt-Mehrens et al.

(10) Patent No.: US 10,658,664 B2
(45) Date of Patent: May 19, 2020

(54) LITHIUM-NICKEL-MANGANESE-BASED TRANSITION METAL OXIDE PARTICLES, PRODUCTION THEREOF AND USE THEREOF AS ELECTRODE MATERIAL

(71) Applicant: ZENTRUM FÜR SONNENENERGIE- UND WASSERSTOFF-FORSCHUNG BADEN-WÜRTTEMBERG GEMEINÜTZIGE STIFTUNG, Stuttgart (DE)

(72) Inventors: Margret Wohlfahrt-Mehrens, Illertissen (DE); Peter Axmann, Erbach (DE); Giulio Gabrielli, Ulm (DE); Marilena Mancini, Westerstetten (DE); Wolfgang Weirather, Dornstadt (DE)

(73) Assignee: ZENTRUM FUR SONNENENERGIE UND WASSERSTOFF FORSCHUNG BADEN-WURTTEMBERG GEMEINNUTZIGE STIFTUNG, Stuttgart (DE)

( * ) Notice: Subject to any disclaimer, the term of this patent is extended or adjusted under 35 U.S.C. 154(b) by 171 days.

(21) Appl. No.: 15/760,564

(22) PCT Filed: Jul. 26, 2016

(86) PCT No.: PCT/EP2016/067770
§ 371 (c)(1),
(2) Date: Mar. 15, 2018

(87) PCT Pub. No.: WO2017/045817
PCT Pub. Date: Mar. 23, 2017

(65) Prior Publication Data
US 2018/0294481 A1    Oct. 11, 2018

(30) Foreign Application Priority Data
Sep. 17, 2015    (DE) .................. 10 2015 115 691

(51) Int. Cl.
H01M 4/525    (2010.01)
H01M 4/505    (2010.01)
(Continued)

(52) U.S. Cl.
CPC ............ *H01M 4/525* (2013.01); *C01G 53/52* (2013.01); *C01G 53/54* (2013.01); *H01M 4/505* (2013.01);
(Continued)

(58) Field of Classification Search
CPC ...... H01M 4/505; H01M 4/525; C01G 53/52; C01G 53/54
(Continued)

(56) References Cited

U.S. PATENT DOCUMENTS

| 2011/0052981 | A1 | 3/2011 | Lopez et al. |
| 2014/0011090 | A1 | 1/2014 | Toya et al. |
| 2014/0034872 | A1* | 2/2014 | Watanabe ......... C01G 45/1242 252/182.1 |

FOREIGN PATENT DOCUMENTS

| CN | 102017277 A | 4/2011 |
| CN | 104300109 A | 1/2015 |

(Continued)

OTHER PUBLICATIONS

Moorhead-Rosenberg, et al., "Magnetic measurements as a viable tool to assess the relative degrees of cation ordering and Mn3+ content in doped LiMn1.5Ni0.5O4 spinel cathodes", Journal of Materials of Chemistry A, vol. 1, pp. 10745-10752, 2013.

(Continued)

*Primary Examiner* — James M Erwin
(74) *Attorney, Agent, or Firm* — Nath, Goldberg & Meyer; Tanya E. Harkins; Joshua B. Goldberg

(57) ABSTRACT

The present invention relates to a method for producing lithium-nickel-manganese-based transition metal oxide par-
(Continued)

ticles, the transition metal oxide particles which are obtained with the method, and the use thereof as electrode material. The present invention particularly relates to lithium-nickel-manganese-based transition metal oxide particles in over-lithiated form with high tamped density, a method for production thereof and use thereof as cathode material in lithium secondary batteries.

15 Claims, 16 Drawing Sheets

(51) Int. Cl.
  *C01G 53/00* (2006.01)
  *H01M 10/052* (2010.01)
  *H01M 10/0525* (2010.01)
  *H01M 4/02* (2006.01)
(52) U.S. Cl.
  CPC ..... *H01M 10/052* (2013.01); *H01M 10/0525* (2013.01); *C01P 2002/60* (2013.01); *C01P 2002/70* (2013.01); *C01P 2002/72* (2013.01); *C01P 2004/03* (2013.01); *C01P 2004/32* (2013.01); *C01P 2004/61* (2013.01); *C01P 2006/11* (2013.01); *C01P 2006/40* (2013.01); *H01M 2004/021* (2013.01); *H01M 2004/027* (2013.01)
(58) Field of Classification Search
  USPC ........................................................ 429/223
  See application file for complete search history.

(56) References Cited

FOREIGN PATENT DOCUMENTS

| | | |
|---|---|---|
| EP | 1 372 202 A1 | 12/2003 |
| JP | 2005-93132 A | 4/2005 |
| JP | 2006-40715 A | 2/2006 |
| JP | 2006-515950 A | 6/2006 |
| WO | 2015/115547 A1 | 8/2015 |

OTHER PUBLICATIONS

Song, et al., "Role of Oxygen Vacancies on the Performance of Li[Ni0.5-xMn1.5+]O4 (x = 0, 0.05, and 0.08) Spinel Cathodes for Lithium-Ion Batteries", Chemistry of Materials, vol. 24, pp. 3101-3109, 2012.

International Search Report dated Sep. 29, 2016 issued in corresponding International Application No. PCT/EP2016/067770.

Moorhead-Rosenberg, et al., "Magnetic measurements as viable tool to assess the relative degrees of cation ordering and Mn3+ content in doped LiMn1.5Ni0,5O4 spinel cathodes" Journal of Materials Chemistry A, vol. 1, pp. 10745-10752, 2013.

Song, et al., "Role of Oxygen Vacancies on the Performance of Li[Ni0.5-xMn1.5+x ]O4(x = 0, 0.05, and 0.08) Spinel Cathodes for Lithium-Ion Batteries", Chemistry of Materials, vol. 24, pp. 3101-3109, 2012.

* cited by examiner

Figure 6a, b:
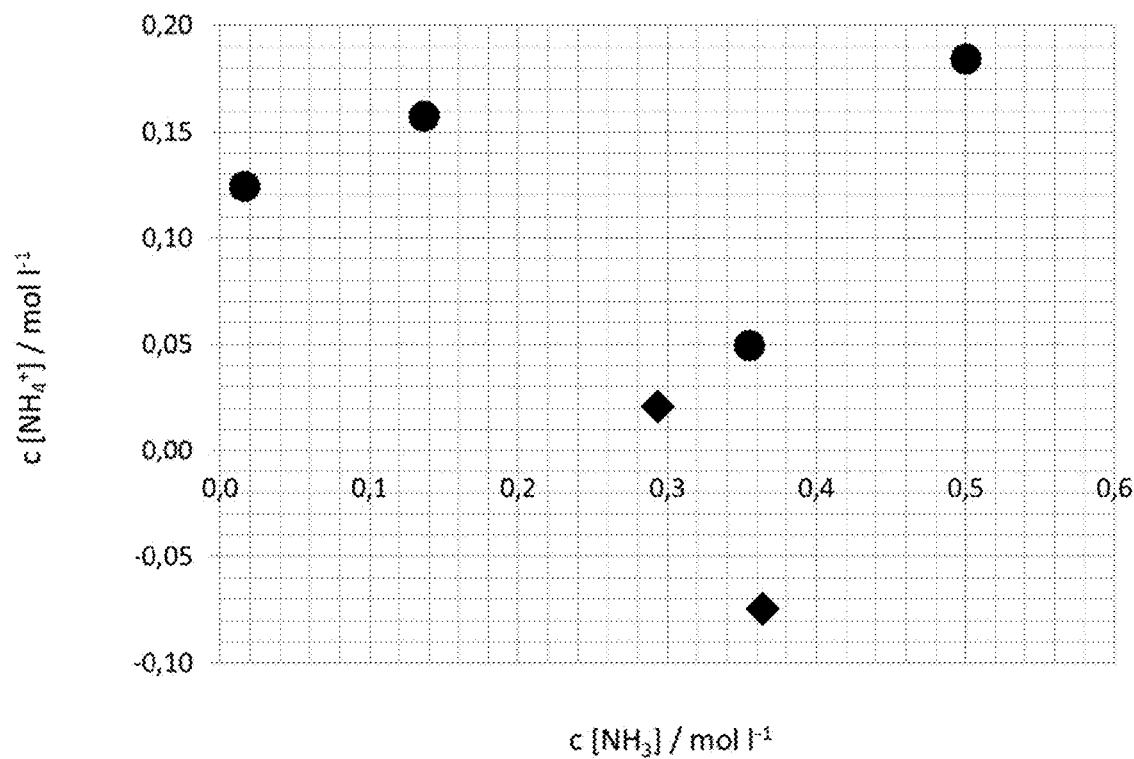
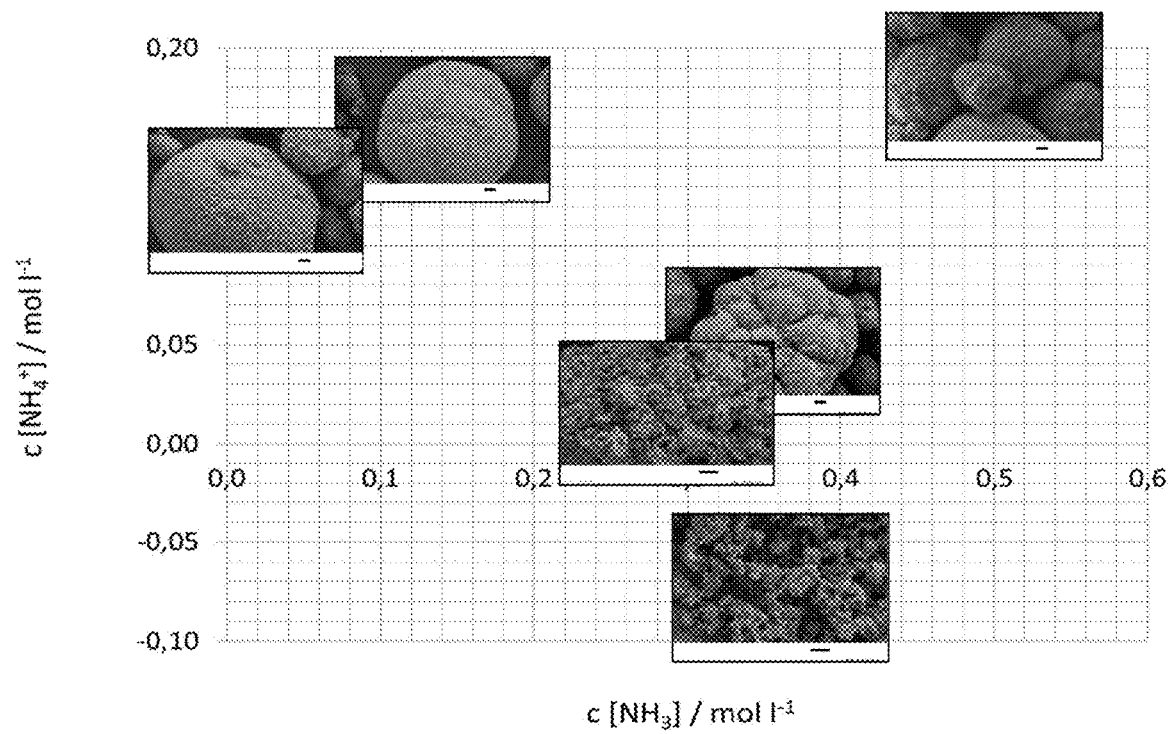

Figure 7:
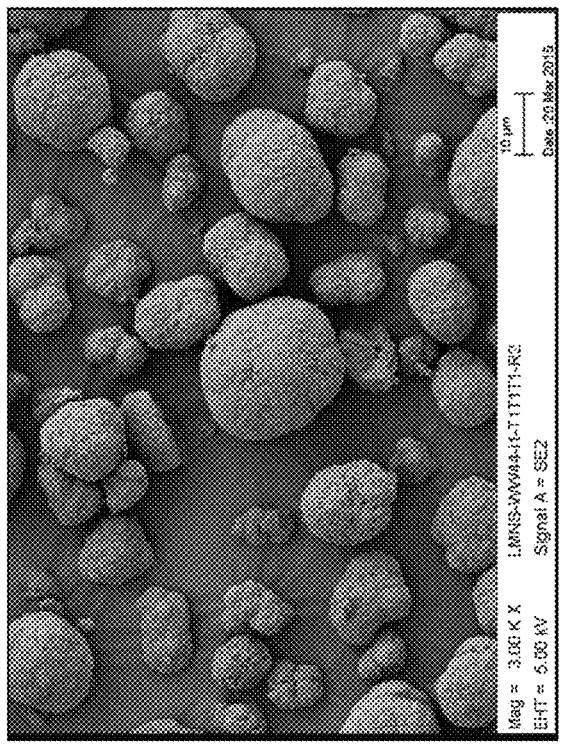
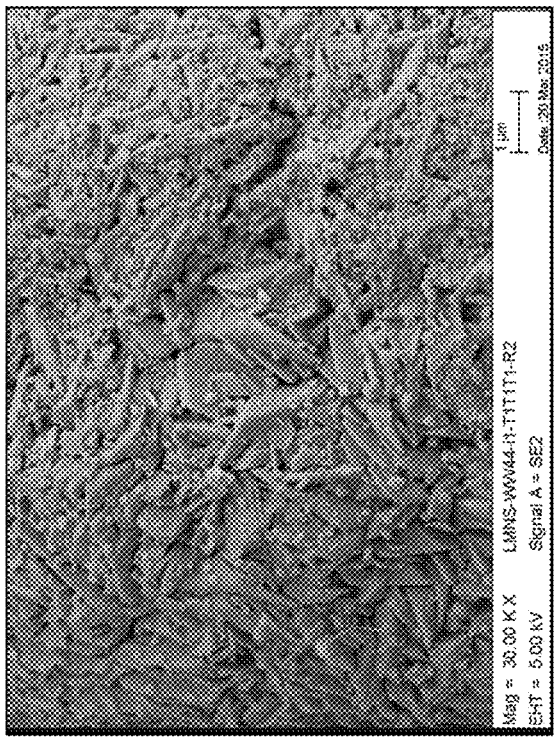
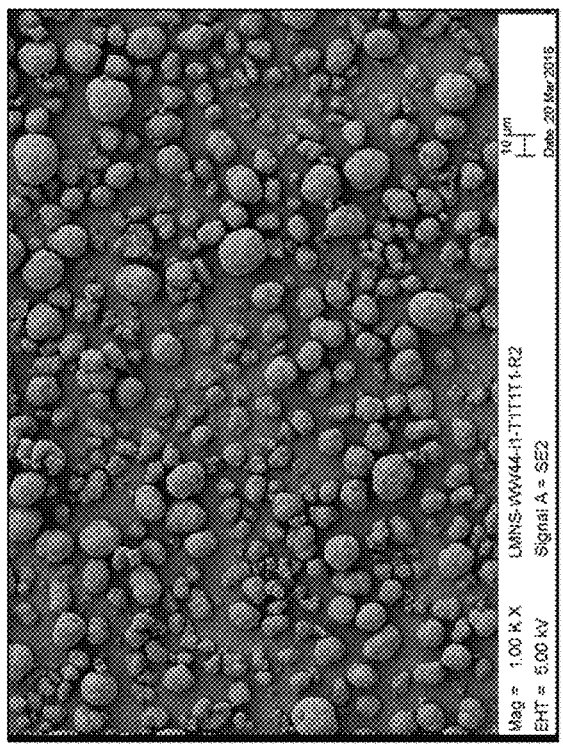
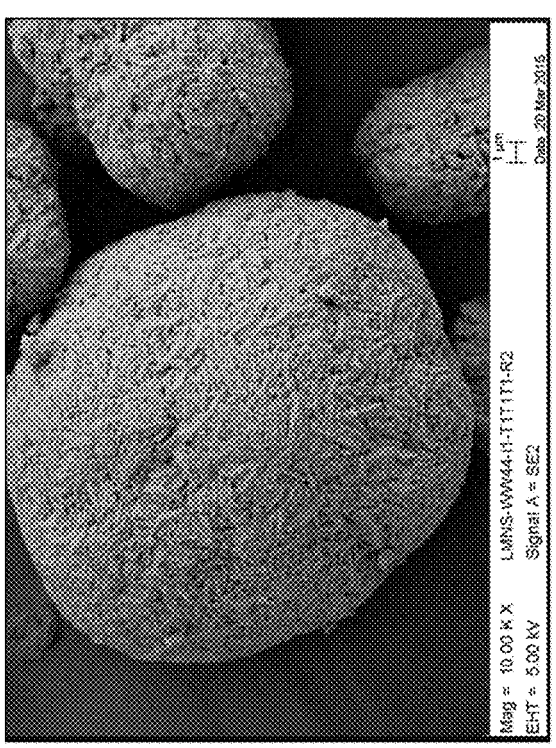

LITHIUM-NICKEL-MANGANESE-BASED TRANSITION METAL OXIDE PARTICLES, PRODUCTION THEREOF AND USE THEREOF AS ELECTRODE MATERIAL

This is a National Phase Application filed under 35 U.S.C. 371 as a national stage of PCT/EP2016/067770, filed Jul. 26, 2016, an application claiming the benefit of German Application No. 201510115691, filed Sep. 17, 2015, the content of each of which is hereby incorporated by reference in its entirety.

FIELD OF THE INVENTION

The present invention relates to a method for producing lithium-nickel-manganese-based transition metal oxide particles, the transition metal oxide particles which are obtained with the method, and the use thereof as electrode material. The present invention particularly relates to lithium-nickel-manganese-based transition metal oxide particles in over-lithiated form with high tamped density, a method for production thereof and use thereof as cathode material in lithium secondary batteries.

BACKGROUND OF THE INVENTION

An essential optimisation objective for the use of lithium ion batteries is to increase energy density. Energy density is determined on the material level by working potential and specific capacitance. At the level of the cell, the packing density of the active material powder is important.

The layer oxides that are typically used as cathode active material in commercial lithium ion cells, lithium cobalt oxide $LiCoO_2$ (LCO), $LiNi_{1/3}Mn_{1/3}Co_{1/3}O_2$ (NMC) and $LiNi_{0.85}Co_{0.10}Al_{0.05}O_2$ (NCA) achieve specific capacitance values between 150 and 180 mAh/g, the lithium manganese spinel $LiMn_2O_4$ (LMO) is used with practical values of about 110 mAh/g.

Lithium-Nickel-Manganese High-Voltage Spinels

Manganese- and lithium-rich layer oxides of the type $xLi_2MnO_3 \cdot (1-x)LiMO_2$ (in which M is typically Ni, Co and Mn) are being developed as promising materials for the next generation, but are not currently being used. They achieve considerably higher specific capacitance values of 250-280 mAh/g than the materials which have been in commercial use up to now. However, these peak values are only achieved with low current rates. Even at a moderate current rate of 1 C the capacitance values fall below 180 mAh/g and into the range of the layer oxides which are already in commercial use. They also contain the expensive element cobalt. A further marked disadvantage of this material class is its structural instability: as cycles progress, the layer structure changes increasingly into a spinel-like structure, which results in a significant reduction of the working potentials and and therewith also a loss of energy density. No approaches to solve this situation have yet been identified.

Lithium-nickel-manganese based transition metal oxide particles of the spinel type (LNMS) are thus promising electrode materials in lithium ion batteries. In particular, they have a high voltage plateau of 4.7 V vs. $Li/Li^+$. The redox principle of electrochemical conversion can be described using the compounds having formula $Li_{1.0}Ni_xMn_{2-x}O_{4-\delta}$. One electron/lithium ion may be replaced per formula unit, which corresponds to a specific capacitance of 147 mAh/g. For purposes of stoichiometry, both the nickel content x and the oxygen content δ may be varied. The distribution of the formal oxidation levels and the resulting electrochemical voltage curve of the materials is described with the formula $Li[Ni^{(II)}_x Mn^{(III)}_{1-2x+2\delta} Mn^{(IV)}_{1+x-2\delta}]O_{4-\delta}$. Two voltage plateaus may occur depending on x and δ: a) a plateau at 4.1 V vs. $Li/Li^+$, which can be associated with the Mn(III)/Mn(IV) redox pair, with utilisation of $(1-2x+\delta)$ electrons/lithium ions per formula unit; b) a plateau at 4.7 V vs. $Li/Li^+$ for the Ni(II)/(IV) redox process, with utilisation of $(2x-2\delta)$ electrons/lithium ions per formula unit. The fully substituted phase $Li[Ni^{(II)}_{0.5} Mn^{(IV)}_{1.5}]O_{4.0}$ is obtained with x=0.5 and δ=0, with as single voltage plateau at 4.7 V vs. $Li/Li^+$.

The working voltage of the LNMS is much higher than the materials currently in commercial use, and so contributes proportionally to the increase in the energy density of the cell. In order to be able to fully exploit the energy density contribution of the LNMS in the battery cell, it must be possible to pack the materials as densely as possible in the cell. For this in particular, a high powder density is required. It is therefom important to produce the materials in such a manner that they have a high powder density and suitable shape and size distribution. At the same time, the production process must be simple and inexpensive.

Production Process for Lithium-Nickel-Manganese High-Voltage Spinels

The related art includes descriptions of various production methods for lithium-nickel-manganese high-voltage spinels.

In sol-gel synthesis, colloidal dispersions called sols are produced from soluble reactants, and are transformed into a solid, three-dimensional network, the gel, by ageing. The gel is a chemical precursor of the product. The products have a small crystallite size, which increases current carrying capacity and is therefore desirable. At the same time, they have a large surface area, which encourages the undesirable side reactions, particularly in high-voltage applications. However, the production method is very expensive. It is therefore not reasonable to raise the production method to industrial dimensions. The method is therefore employed mainly in the purely scientific-experimental context.

Besides the above, there are also descriptions of pure solid synthesis variants, which are used in different ways in the production of battery materials. In particular, they are also important as cathode material in the technical production of $LiCoO_2$. In the method, oxides, carbonates or other crystalline starting compounds are mixed with each other and then subjected to heat treatment. The particles used typically have high density and low porosity. The reactants need to be pulverised individually or together with each other to reduce the particle size, ensure the most homogeneous particle distribution possible in the mixture, and so shorten the diffusion paths in the calcining step. In contrast to the sol-gel method, the particles used are typically microscopically small, so the diffusion paths for the reaction are relatively long. In order to accelerate and complete the conversion, the reactions are conducted at high temperatures, possibly as high as 800° C. to 900° C. for LNMS. Calcining temperatures are a critical parameter for the LNMS: the nickel-manganese spinel tends to release oxygen from the lattice at temperatures above 700° C. This leads to the formation of oxygen-poor phases, wherein nickel oxide NiO may be precipitated from the lattice as a separate phase. This process is reversible, however. If high temperature calcining is followed by a healing process at 700° C. an, the NiO may be reassimilated in the lattice, and the oxygen gaps may be filled. In this way, the desired target stoichiometry may be set at the crystalline level.

From the technical perspective, however, this healing process is associated with a great deal of time, and consequently cost, if all impurities that interfere with the electrochemical behaviour are to be removed from the lattice. The samples obtained in this way yield greater densities than those from the sol-gel process, and have a smaller specific surface. Grinding processes are necessary afterwards to adjust the materials to the desired particle size specification, and these in turn make the technical process more expensive. Moreover, it is not possible to entirely prevent impurities from being introduced during the grinding process.

In both of the methods described, the sol-gel and solid synthesis method, extremely pure starter materials must be used. The stringent requirements regarding quality and purity of the raw materials raise the costs of producing the raw materials.

Besides these methods, combination methods are also described, in which a precursor, e.g., a transition metal carbonate, oxide or hydroxide is prepared by precipitation and then reacted with stoichiometric quantities of a lithium compound to obtain the end product. The purity requirements applicable to the reactants in this method are not as stringent, since soluble impurities are flushed out in the filtration and washing process of the precipitate and so do not remain in the product. Such spherical materials are also described for the class of LNMS. However, the maximum powder densities achieved in the products are low.

Wang et al. (Journal of Power Sources, 274 (2015) 451-457) reported with reference to a parameter screening that tamped densities in the range of 0.7-1.5 g/cm$^3$ can be obtained by precipitations of hydroxides of the compound $Ni_{0.25}Mn_{0.75}(OH)_2$ in the presence of $NH_3$. The secondary agglomerates are constructed from flake-like primary crystallites which are arranged in the grain like a house of cards. This arrangement results in the formation of corresponding cavities in the grain, which explain the low tamped density values. High temperatures would have to be used when sintering the particles to obtain dense grains; this would again lead to crystallite growth and undesirable segregation of NiO.

Over-Lithiated Transition Metal Oxides

With regard to use in battery cells, it is typically necessary during assembly to ensure that the positive and the negative electrode have the same charge state. If it is intended to use active material in the form of $Li[Ni^{(II)}_{0.5}Mn^{(IV)}_{1.5}]O_{4.0}$ and also use the lithium-rich phases at the same time, the counter electrode may be brought to the same charge state by prelithiation, for example. In this case, both electrodes would be assembled in the partially charged state.

If it is not possible to pre-lithiate the anode easily because of the associated technical conditions, it may be helpful to supply the material for cell construction in over-lithiated form $Li_{1+x}[Ni(II)_{0.5}Mn^{(IV)}_{1.5}]O_{4.0}$ (0<x<1.5). In this case, it is not necessary to pre-lithiate the negative electrode, and assembly is carried out in the fully discharged state. The over-lithiated material $Li_{1+x}[Ni^{(II)}_{0.5}Mn^{(IV)}_{1.5}]O_{4.0}$ may advantageously also be introduced as an additive in cells with anode materials such as silicon, amorphous carbon or other comparable materials which are subject to high, irreversible starting losses. In such cases, the lithium excess x of the cathode material may be used to compensate for the losses at the anode. After the compensation, the additive functions as cathode material on the high-voltage plateau in der cell.

Therefore, it is important to provide materials with high capacitance and good load-bearing capability, and at the same time to produce them in such manner that they have high tamped densities and a suitable shape and size distribution. Moreover, it is important a implement a process with which the high-density materials can easily be converted to their over-lithiated form. Additionally, all steps in the production process should be inexpensive and easy to put into practice.

Particularly promising electrode materials in lithium ion batteries are over-lithiated spinels of the type $Li_2M_2O_4$. The chemical preparation of these is based on the production of a spinel with starting composition of $LiM_2O_4$. This is converted in a subsequent reduction process in the presence of a lithium source. Since these compounds undergo structural changes at higher temperatures, reactants and process conditions must be selected such that the critical temperature is not exceeded.

Amine et al. (J. Electrochem. Soc., Vol. 143 (1996) No. 5, 1607-1613) produce a finely particulate $LiNi_{0.5}Mn_{1.5}O_4$ by thermal decomposition of corresponding acetates with the sol-gel synthesis method. The product obtained is reacted with a solution of lithium iodide in acetonitrile. A sixfold excess of lithium iodide is needed. The product stoichiometry is indicated with $Li_2Ni_{0.5}Mn_{1.5}O_4$. The working potential of this material is 3 V vs. $Li/Li^+$. A maximum capacitance of 170 mAh/g is achieved; the capacitance falls to 75% of the initial capacitance within 30 cycles. The disadvantage of this method is that very large excesses of lithium iodide are needed as well as the use of toxic solvents. The required reaction time of 13 h is long, expensive methods must be employed to dispose of the solvent and the excess lithium iodide.

West et al. (Electrochimica Acta, Vol. 45 (2000) 3141-3149) produce $Li_2Mn_2O_4$ by converting $LiMn_2O_4$ in a lithium iodide melt. The reaction takes five hours, the temperature is 460° C. This temperature is slightly higher than the melting point of lithium iodide (446° C.). No information is provided regarding the production and specification of the starter material $LiMn_2O_4$. Nickel-containing materials are not described. In the first two cycles, about 1 lithium is replaced per manganese. A 4.7 V plateau does not exist. No information is provided about cycle stability.

Peramunage et al. (J. Electrochem. Soc., Vol. 145 (1998) No. 4, 1131-1136) use a $Li_{1.1}Mn_2O_4$ which is prepared by thermal conversion of $MnO_2$ with LiOH as the starter compound. For lithiation, the pre-dried material is introduced into dry hexane. Stoichiometric quantities of 2.5 M solution of butyl-lithium in hexane are added slowly with vigorous agitation. The $Li_2Mn_2O_4$ produced is then washed with hexane and dried. Electrochemically, 1.4 $Li/Mn_2$ are used, which corresponds to a specific capacitance of 198 mAh/g relative to $Li_2Mn_2O_4$. About 60% of this capacitance is discharged on a plateau at 4 V vs. $Li/Li^+$, then 20% of the capacitance each at 2.8 V and 2.2 V vs. $Li/Li^+$.

Park et al. (Electrochemical and Solid-State Letters, 8 (2005) A163-A167) prepare a $LiNi_{0.5}Mn_{1.5}O_4$ from the corresponding metal nitrates using an ultrasonic spray pyrolysis process. The authors demonstrate that $LiNi_{0.5}Mn_{1.5}O_4$ can be cycled electrochemically on the 3 V plateau ($LiNi_{0.5}Mn_{1.5}O_4 \leftrightarrow Li_2Ni_{0.5}Mn_{1.5}O_4$). A chemical or electrochemical conversion to $Li_2Ni_{0.5}Mn_{1.5}O_4$ is not described.

All of the lithiation methods described are extremely complex. They either require critical reaction media such as butyl lithium, toxic solvents, or high temperatures, and they are therefore not suitable for conversion on a large industrial scale.

Accordingly, there is a need for methods to produce lithium-nickel-manganese based transition metal oxide particles, particularly over-lithiated lithium-nickel-manganese based transition metal oxide particles, in which the drawbacks of the methods described in the related art have been overcome. In particular, the materials obtained should be constructed from small crystallites to allow rapid discharging/charging kinetics; however, small crystallites usually require low conversion temperatures, and the processes which are suitable for them typically do not result in the requisite grain densities. At the same time, however, the grain density of the materials should be high to enable high charging plateaus in the cells. Moreover, the specific surface area should be low to suppress side reactions, something which has only been achieved with high temperature processes in the related art.

OBJECT OF THE INVENTION

The object underlying the invention is therefore to produce lithium-nickel-manganese based transition metal oxide materials which are electrochemically highly active and have high capacitance, and which have both small crystallite size and high powder density at the same time, and to provide a simple, economical and efficient method for production thereof.

SUMMARY OF THE INVENTION

The object is solved with the provision of a method for producing lithium-nickel-manganese based transition metal oxide particles according to Claim 1, provision of a method for producing over-lithiated lithium-nickel-manganese based transition metal oxide particles according to Claims 8 and 11, the materials according to Claims 12 and 13 produced by these methods, and uses thereof as electrode material according to Claim 14. Preferred or particularly practical variants of the invention are described in the subordinate claims.

BRIEF DESCRIPTION OF THE FIGURES

FIGS. 6a, b: Overview of the particle morphology of the embodiments as a function of the concentrations of $NH_3$ and $NH_4^+$ in the mother liquor after precipitation of the transition metal precursors (a: Overview in the characteristic diagram, b: Overview of the morphology).

FIG. 7: SEM images of the particles of the over-lithiated product obtained in Example 1.

DETAILED DESCRIPTION OF THE INVENTION

Figure 1A:
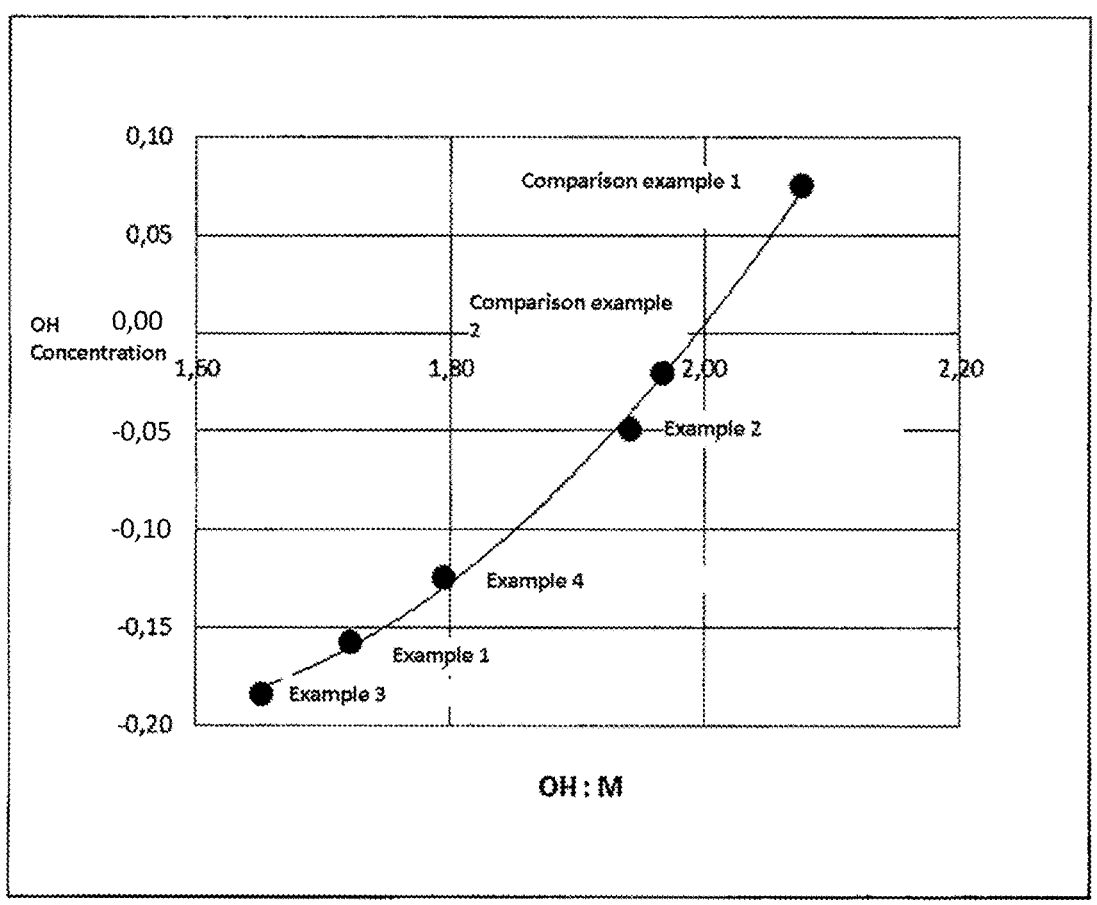
FIGS. 1a, b: Representation of the morphology of the particles obtained as a function of the reactant input (a: Overview in the characteristic diagram, b: Overview of the morphology).

In the context of the present invention, it was found surprisingly that the disadvantage of the prior art may be solved by creating a method in which in a first step a lithium-free transition metal precursor is precipitated from an aqueous solution of transition metal salts by adding an alkali metal hydroxide and $NH_3$, wherein the alkali metal hydroxide is added in a less than stoichiometric ratio to the total content of transition metal ions in the reaction mixture. By the addition of $NH_3$ to the reaction mixture, full precipitation can be achieved despite that fact that a less than stoichiometric quantity of hydroxide ions ($OH^-$ ions) is added. In particular, it is necessary that the concentration of ammonium ions ($NH4^+$ ions) in the reaction mixture is equal to 0.05 mol/l or more after a chemical equilibrium has been established. In this way, a lithium-free transition metal precursor with spherical or spheroidal particle morphology and at the same time high tamped density may be obtained, wherein these particle properties are also preserved or even improved in the subsequent method stages. It is thus particularly advantageous for achieving an optimal particle morphology to establish a ratio of $NH_4^+$ ions to $NH_3$ in the reaction mixture as described in the following after establishing a chemical equilibrium of the precipitation reaction.

The present invention thus relates to a method for producing transition metal oxide particles having general formula (1):

$$LiMn_{1.5+y}Ni_{0.5-y-z}M_zO_4 \qquad (1),$$

wherein M comprises one or more elements from the group of Co, Mg, Fe and Zn,
y is a value from 0 to less than 0.5,
z is a value from 0 to 0.1, and
(y+z) is a value less than 0.5,
and the method comprises the steps of:
(a) reacting an aqueous solution of manganese salts, nickel salts and optional one or more further salts of the elements Co, Mg, Fe and Zn with an aqueous solution of an alkali metal hydroxide and $NH_3$ to precipitate a lithium-free transition metal precursor from the reaction mixture,
  wherein the concentration of $NH_4^+$ ions in the reaction mixture after establishing a chemical equilibrium is 0.05 mol/l or more,
(b) isolating and optionally drying the precipitated lithium-free transition metal precursor from the reaction mixture, (c) reacting the lithium-free transition metal precursor with an aqueous solution of a thermally decomposable lithium compound to obtain a lithium-containing transition metal precursor, and (d) calcining the lithium-containing transition metal precursor at a temperature of 300° C.-800° C.

According to the method of the present invention, the production of high-density, high-capacitance materials according to the invention thus takes place over various intermediate stages (a) to (d) and optionally (e). In this context, in method step (a) a high-density, lithium-free precursor is produced, which in the following method step (b) is isolated and optionally dried. In step (c) the lithium-free precursor is then converted to a high-density lithium-containing precursor by reacting it with a thermally decomposable lithium-containing compound. The transition metal oxide particles according to the invention are then obtained by calcining the lithium-containing precursor in step (d).

In order to produce over-lithiated transition metal oxide particles, the transition metal oxide particles, particularly the lithium-containing transition metal oxide particles obtained in step (d), are converted in a solid phase reaction by converting them with a lithium-containing compound in the presence of reducing agent.

Method Step (a): Production of a Lithium-Free Transition Metal Precursor

Method step (a) of the method according to the invention particularly comprises the conversion of an aqueous solution of manganese salts, nickel salts and optionally further salts as described in the following text with an aqueous solution of an alkali metal hydroxide and $NH_3$, to precipitate a lithium-free transition metal precursor from the reaction mixture, wherein the concentration of $NH_4^+$ ions in the reaction mixture is equal to 0.05 mol/l or more after an chemical equilibrium has been established.

The chemical complete equation for the precipitation reaction may be represented as follows:

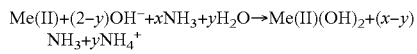

$$Me(II)+(2-y)OH^-+xNH_3+yH_2O \rightarrow Me(II)(OH)_2+(x-y)NH_3+yNH_4^+$$

In this context, x and y must be selected such that the concentrations of $NH_3+NH_4^+$ as described are obtained.

The lithium-free transition metal precursor is thus produced in a precipitation process from an aqueous solution of manganese salts, nickel salts and optionally other salts of the elements Co, Mg, Fe, Zn, and optionally of Al, V, Cr, Ti, Cu, Be, Ca, Sr, Ba and La. By adjusting the corresponding stoichiometry of the reactants, it is possible to obtain lithium-free transition metal precursors having general formula (3):

$$Mn_{1.5+y}Ni_{0.5-y-z}M_zO_4H_4 \quad (3)$$

wherein M is particularly selected from one or more of the elements Co, Mg, Fe and Zn, and also optionally Al, V, Cr, Ti, Cu, Be, Ca, Sr, Ba and La, y is a value from 0 to less than 0.5, z is a value from 0 to 0.1 and (y+z) is a value less than 0.5. In a preferred embodiment, y is a value from 0 to 0.2, particularly preferably from 0 to 0.1.

In a preferred embodiment, the concentration of $NH_3$ in the reaction mixture after establishing a chemical equilibrium is 0.01 to 1.0 mol/l. Particularly due to the ratio with the concentration of $NH_4^+$ ions in the reaction mixture after establishing a chemical equilibrium of 0.05 mol/l or more in combination with the $NH_3$ concentration from 0.01 to 1.0 mol/l, an advantageous spherical or spheroidal grain shape may be obtained with high tamped density at the same time.

After establishing a chemical equilibrium, the concentration of $NH_4^+$ ions in the reaction mixture is preferably from 0.07 to 0.25 mol/l, particularly preferably 0.08 to 0.20 mol/l.

After establishing a chemical equilibrium, the concentration of $NH_3$ in the reaction mixture is preferably from 0.05 to 0.75 mol/l, particularly preferably 0.07 to 0.5 mol/l, most particularly preferably 0.1 to 0.3 mol/l, wherein combinations with the aforementioned concentration of $NH_4^+$ ions in the reaction mixture are particularly preferred.

Figure 1B:
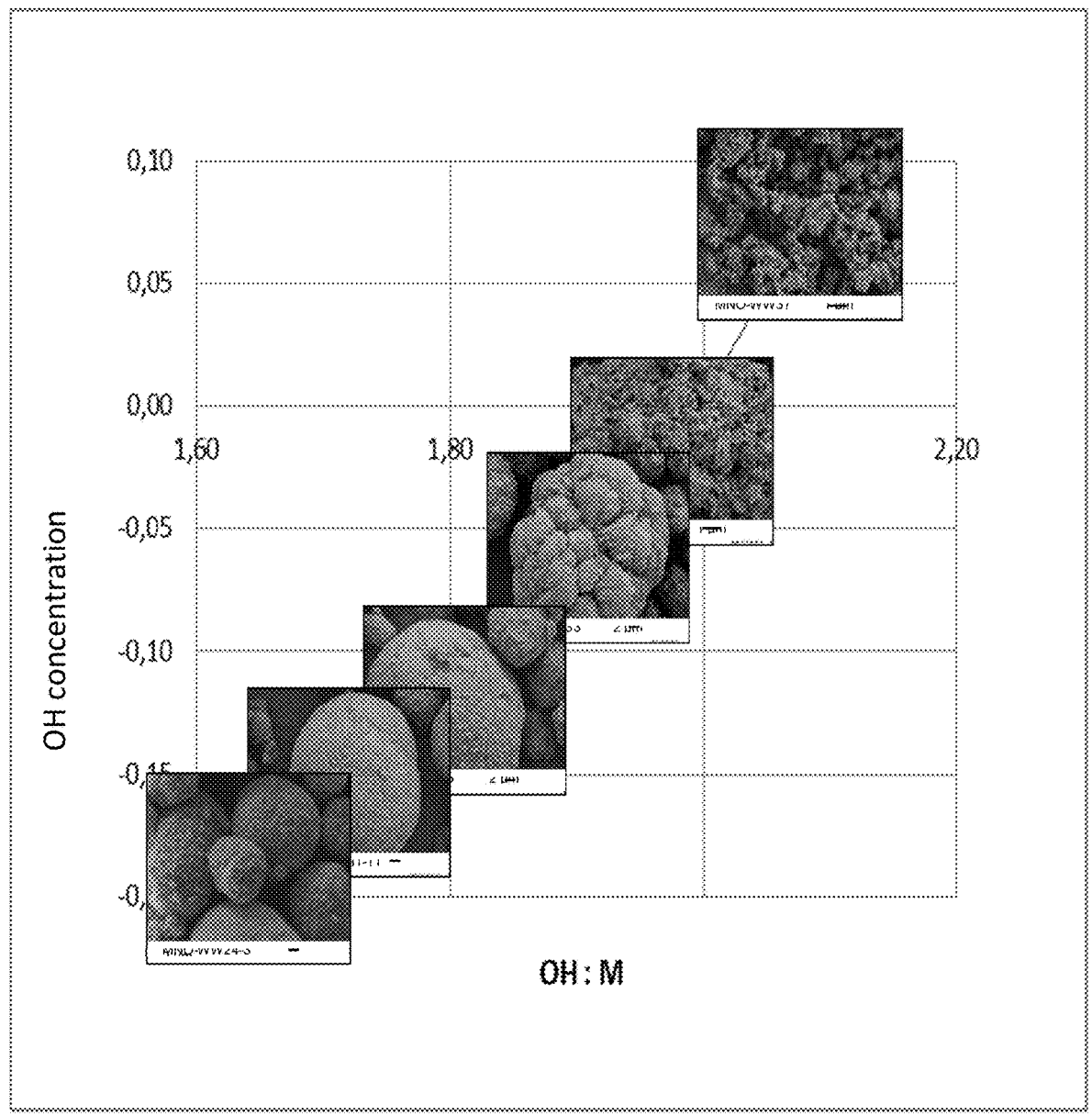

Alternatively, the concentration of $NH_4^+$ ions and the concentration of $NH_3$ in the reaction mixture after establishing a chemical equilibrium may also be defined by specifying the addition of corresponding reactants. In this way, the previously described concentration of $NH_4^+$ ions and the concentration of $NH_3$ in the reaction mixture after establishing a chemical equilibrium is arrived at by the molar initial ratio of $OH^-$ ions to metal ions ($OH^-:M^{2+}$) and by the molar initial ratio ($[OH^-+NH_3]:M^{2+}$) In a preferred embodiment, the molar initial ratio of OH ions to metal ions ($OH^-:M^{2+}$) <1.95, particularly preferably between 1.5 and 1.9. In order to achieve complete precipitation despite this use of OH ions in a less than stoichiometric quantity, $NH_3$ is added to the reaction mixture in such a quantity that the molar ratio ($[OH^-+NH_3]:M^{2+}$)>2, preferably from 2.1 to 2.5. The influence of the molar initial ratio of OH ions to metal ions on the particle morphology of the transition metal oxide particles produced in the method according to the invention is illustrated with exemplary embodiments in FIG. 1. The lithium-free transition metal precursor is precipitated from the reaction mixture by the addition of an alkali metal hydroxide. The alkali metal hydroxide is particularly selected from sodium hydroxide (NaOH), potassium hydroxide (KOH), lithium hydroxide (LiOH) or mixtures thereof, sodium hydroxide being preferred.

The salts used in step (a) are not subject to any particular restriction, as long as the salts are readily soluble in water. Nitrates and sulphates are preferred, nitrates are particularly preferred, wherein mixtures of nitrates, sulphates or optionally other salts are also possible.

The conversion in step (a) may take place in any reaction vessel or reactor. The performance of the reaction may thus be conducted in staged manner, semi-continuously or continuously. The performance of the reaction is preferably carried out in a continuously operating reactor, such as a continuously operating stirred reactor. Performance in a continuously operating reactor makes it possible to set constant volume flows particularly efficiently, in order to obtain the desired product stoichiometry. In particular, performance in a continuously operating reactor makes it possible to set reaction parameters such as temperature, stirring speed and dwell time particularly easily, so that the progress of the precipitation reaction may be influenced as necessary. This enables a chemically defined product with advantageous properties such as particle morphology and tamped density to be obtained particularly efficiently. Moreover, the concentration of $NH_4^+$ ions and of $NH_3$ in the reaction mixture from the mother liquor may be determined after the solid material has been separated, and thus also while the reactor is operating.

Particularly when the reaction is performed in a continuously or semi-continuously operating reactor, the reaction temperature is typically in the range from 35-90° C., more preferably from 45 to 75° C., and particularly preferably from 55 to 65° C.

Particularly when the reaction is performed in a continuously or semi-continuously operating reactor, it is necessary to wait until a chemical equilibrium is established before determining the concentration of $NH_4^+$ ions and of $NH_3$ in the reaction mixture. The chemical equilibrium is typically established within 6 dwell times, which may correspond to a time from 6 to 18 h, particularly 10 to 14 h depending on the size and configuration of the reactor, and the volume added. The dwell time is defined by the period for which a defined volume of liquid remains, i.e. "dwells" in a reactor. If the reactor has a volume of x litres, the dwell time corresponds to the time in which x litres of total starting solutions are added, i.e. in which the reactor volume has been replaced once by the inflow of reactant solutions, wherein possibly occurring backmixing operations are ignored. Normally when establishing equilibrium in 6 dwell times, 6 h thus corresponds to a dwell time of 1 h, and 18 h for establishing equilibrium corresponds to a dwell time of 3 h.

Depending on the type and size of the reactor and stirrer used, usual stirring speeds are between 200 and 1500 rpm, particularly between 500 and 1000 rpm.

The molar concentrations of the reactants used are typically selected such that the solid contents obtained constitute between 5 and 20 wt %, preferably between 10 and 15 wt % relative to the total weight of the reaction mixture, wherein the maximum solid content of about 20 wt % is limited by the saturation concentrations of the reactant solutions.

The precipitation reaction in step (a) typically takes place in a protective gas atmosphere, such as a nitrogen atmosphere or an argon atmosphere. Processing in air can lead to anoxidation of the materials. The presence of oxygen may particularly damage the layer structure of the particles formed during the precipitation reaction. This may lead to disordered structures with a distorted diffractogram, which however does not usually have a negative effect on the quality of the product according to the invention.

The lithium-free precursors obtained typically form as a sediment which is readily separable, by filtration for example. The lithium-free precursors obtained are noteworthy for the spherical or spheroid growth structure of the primary crystallites. The precursors may particularly exhibit tamped densities of 2.0 g/cm³ or more. A critical factor determining high density is that the formation of platelike crystallites is limited, and three-dimensional crystallites preferably form that are densely packed in the grain. The materials according to the invention are particularly characterized in that the crystallites are constructed mainly from angular, three-dimensional crystals with a rhombohedral or similar shape. Structurally, the precipitated particles are usually constituted of a mixed hydroxide with a brucite-like structure, as revealed in samples processed in nitrogen.

The particle sizes of the lithium-free precursors may be between 1 μm and 40 μm. The shape may be of spherical or spheroidal morphology, or it may have angular edges. The diffusion paths from the surface to the middle of the largest particles are typically up to 20 μm long.

Method Step (b): Isolating and Optionally Drying the Lithium-Free Transition Metal Precursor In step (b) of the method according to the invention, the lithium-free transition metal precursor precipitated from the reaction mixture in step (a) is usually isolated and optionally dried. Isolation may be carried out by usual methods and means, such as filtration, for example by using a suction strainer, or by centrifuging, so that the solid obtained is separated from the mother liquor. The solid obtained is usually washed, for example with demineralised water, and then dried. Drying may be carried out in a standard furnace, a muffle furnace, for example. The temperatures are usually between 50 and 150° C., preferably between 80 and 130° C.

Typically, a dried powder is obtained which however may still contain some residual moisture.

In a preferred embodiment, drying in step (b) is carried out in a non-oxidising atmosphere, for example in a nitrogen atmosphere or an argon atmosphere.

Method Step (c): Production of a Lithium-Containing Transition Metal Precursor

Method step (c) of the method according to the invention particularly comprises reacting the lithium-free transition metal precursor obtained in step (b) with a solution, particularly an aqueous solution of a thermally decomposable lithium compound. In this way, a lithium-containing transition metal precursor may be obtained. Optionally, a non-aqueous solution or an aqueous and non-aqueous suspension may be used.

In order to obtain transition metal oxide particles having the general formula (1) described previously, it is particularly essential that the lithium compound used here is thermally decomposable, wherein thermally decomposable means that the lithium compound can be converted into lithium oxide by heating without producing other byproducts which are solid at room temperature. Such thermally decomposable lithium compounds particularly include lithium hydroxide (LiOH), lithium carbonate ($LiCO_3$) and lithium nitrate($LiNO_3$). Lithium hydroxide is the preferred lithium compound because of its qualities of thermal decomposability and good solubility in water.

The nature of the reaction is not subject to any particular limitations. Typically, the lithium-free transition metal precursor obtained in step (b) is mixed with an aqueous solution of lithium hydroxide, and the suspension obtained therefrom is evaporated to dryness. The lithium-free transition metal precursor is impregnated with lithium hydroxide. The transition metal precursor then dried if required, wherein some residual moisture may still remain in the product obtained. The quantity of lithium hydroxide solution is usually selected such that the atomic ration between Li and (Mn+Ni) is about 0.5.

Method Step (d): Production of Lithium-Containing Transition Metal Oxide Particles Method step (d) of the method according to the invention particularly comprises calcining the lithium-containing transition metal precursor obtained in step (c) at a temperature from 300° C.-800° C., preferably at a temperature from 500-750° C. Calcining is carried out in an atmosphere which contains oxygen, preferably atmospheric oxygen, to enable the hydroxides to be converted to oxide. Optionally, calcining may also be carried out in an oxygen-rich atmosphere or in pure oxygen. Optionally, a predrying step may be conducted at temperatures from 80° C. to 200° C. before the calcining operation. Further, the lithium-containing transition metal precursor obtained in step (c) may also undergo homogenisation, using a powder mill for example, before it is calcined.

The calcining in step (d) may be carried out in one, two or multiple stages. The calcining is preferably conducted in two stages, and calcining initially takes place at a low temperature, for example 300° C. to 450° C., followed by a second stage at a higher temperature, for example from 450° C. to 700° C. The calcining process typically takes place over a period of 2 to 24 h, preferably from 4 to 12 h. In a calcining operation with two or more stages, the first stage (pre-calcining) takes place at a low temperature, for 2 h to 4 h for example, and the second or further stage (final calcining) takes place at a higher temperature, for 4 to 20 h, for example for 10 to 14 h.

Given the long diffusion paths and high density of the particles, high temperatures are usually necessary in solid reactions to ensure complete conversion. Surprisingly, however, it was demonstrated for the particles according to the invention that despite the high density even with large grain sizes of the particles, it is possible to convert them completely into the transition metal oxide particles of the invention after a short time with very low calcining temperatures of less than 800° C., particularly less than 700° C. or lower.

Complete conversion of the lithium-containing transition metal precursor into the product may already take place at 350° C. in 3 h for example. In particular, the calcining gives rise to the advantageous spinel structure according to the invention. A controlled adjustment of the crystallite size may be made directly in a first calcining stage or separately in a second calcining stage. The products according to the invention are usually radiographically phase pure. Besides the fact that the crystallite size can be adjusted at will by appropriate selection of the calcining conditions, i.e. the calcining temperature and calcining duration with high density at the same time, the method according to the invention is also notable because high temperatures are not required, so that the formation of NiO phase impurities may advantageously be avoided. High temperatures and long recovery times such as are common in the methods of the related prior art can therefore be omitted. Energy consumption and production costs are reduced compared with the production methods described in the related art.

The particles according to the invention may be described as agglomerates of small primary crystallites for larger (secondary) particles. The special growth structure of the crystallites obtained in the particles enables rapid, complete conversion to the preferred spinel structure at very low temperatures and with short reaction times, for example 3 h at 350° C., despite the high grain density and particle sizes obtained. Unlike the plate-like primary crystallites, in the present invention a high-density growth structure of the particles is achieved due to the special, three-dimensional, angular shape of the primary crystallites. Some of the crystallites may be described as having shapes related to rhombohedra or ditrigonal scalenohedra. With the method according to the invention, the advantageous particle morphology obtained in the precipitation reaction (step (a)) may be largely preserved as described previously. It is decisive for the high tamped density in the particles obtained according to the invention that the formation of plate-like crystallites be limited, and that densely packed, preferably three-dimensional crystallites be formed in the grain.

In this way, the method according to the invention enables high-density spherical or spheroid transition metal oxide particles to be produced, which have a high tamped density and of which the size of the primary crystallites can be adjusted at the same time freely in a range from a few tens of nanometres to the micrometre scale with the calcining conditions, particularly by selection of the calcining temperature. In this way, both very small and large crystallite sizes may be set irrespective of the tamped density. In this context, the products according to the invention have greater tamped densities than the particles described in the prior art. In particular, it was demonstrated in the context of the present invention that the lithium-free precursor already has a high tamped density after the precipitation reaction, and this is advantageously increased further by the conversion to a lithium-containing product after calcining.

In a further aspect, the present invention thus relates to transition metal oxide particles with general formula (1), which are obtainable with the previously described method:

$$LiMn_{1.5+y}Ni_{0.5-y-z}M_zO_4 \qquad (1).$$

M is particularly selected from one or more of the elements Co, Mg, Fe and Zn, and also optionally Al, V, Cr, Ti, Cu, Be, Ca, Sr, Ba and La. y is particularly a value from 0 to less than 0.5, z is a value from 0 to 0.1, and (y+z) is a value less than 0.5. In a preferred embodiment, y is a value from 0 to 0.2, particularly preferably a value from 0 to 0.1.

The particles according to the invention typically have an average particle size from 1 bis 40 μm, preferably from 2 to 30 μm.

The average size of the primary crystallites of the particles according to the invention is typically from 10 to 1000 nm, preferably from 20 to 200 nm.

In particular, the ratio between particle size and primary crystallite is typically between 1000:1 and 20:1, particularly between 100:1 and 40:1.

Surprisingly, it was found that with the method according to the invention as described previously it is possible to obtain transition metal oxide particles with high tamped density, particularly with a tamped density of 2.0 g/cm³ or higher, for example 2.1 g/cm³, 2.2 g/cm³, 2.3 g/cm³ or higher. The tamped density of the particles according to the invention is typically in the range from 2.1 to 2.8 g/cm³, particularly from 2.2 to 2.7 g/cm³.

In particular, the ratio of the largest diameter to the smallest diameter of a particle is 1.8 or less, particularly 1.4 or less, preferably 1.2 or less, particularly preferably 1.1 or less.

Method Step (e): Production of Over-Lithiateden Transition Metal Oxide Particles In a further aspect, the present invention relates to a method for producing over-lithiated transition metal oxide particles. In this aspect, particularly the transition metal oxide particles obtained in step (d) of the method described above are used as the starting material.

The over-lithiated transition metal oxide particles may be produced by chemical or electrochemical methods, wherein over-lithiation by chemical methods is preferred.

Chemical Over-Lithiation (e1)

The present invention thus relates further to a method comprising the mixing of lithium-containing transition metal oxide particles, particularly the transition metal oxide particles obtained in step (d) of the method described above, with a lithium-containing compound and a reducing agent, and converting the mixture in a solid phase reaction at a temperature from 120° C. to 400° C. The conversion usually takes place in a protective gas atmosphere, for example in a nitrogen or argon atmosphere.

In a particularly preferred embodiment, the conversion is carried out with lithium iodide. In this cast, the iodide contained in the lithium iodide functions as a reducing agent, so it is not necessary to add a further reducing agent. In this embodiment, the conversion preferably takes place below the melting temperature of the lithium iodide of 446° C., so that a solid phase reaction takes place. The temperature is preferably between 150° C. and 400° C., particularly preferably between 180° C. and 300° C.

Surprisingly, it was found that when the transition metal oxide particles according to the invention are used, conversion to the over-lithiated product may take place quickly and completely even at temperatures at which a pure powder mixture is present, based on the position of the melting points. The conversion thus takes place in the form of a low temperature solid state reaction. The reaction according to the invention begins at temperatures as low as less than 150° C. and runs to completion even at temperatures below 300° C., for example at 180-200° C., with a short reaction time. The effect of the rapid conversion already at temperatures below the melting points of the reactants, particularly below the melting point of lithium iodide of 446° C., was particularly unexpected since the reactants are present as a physical mixture of the pure solids, and no moistening or wetting was expected. The transition metal oxide particles according to the invention are also present in the form of high-density particles, some of which exhibit long diffusion paths. It was thus rather to be expected that a conversion to the over-lithiated product would only take place, if at all, above the melting temperatures of the reactants, for example of the lithium iodide. Instead, it was possible to achieve a complete conversion to the over-lithiated product within a short reaction time even though the reactants were present in a non-homegenous mixture and the particle diameters of the transition metal oxide particles according to the invention were >30 μm.

A further advantage of the method according to the invention for producing the over-lithiated product is that when stoichiometric quantities of lithium iodide are used a complete conversion takes place without the formation of byproducts. Any impurities, such as may occur due to incomplete conversion or excess lithium iodide in the reactant mixture may be removed from the product obtained by washing with a suitable solvent, for example n-hexane.

A significant advantage of this reaction is also that the iodine formed is recovered completely and in pure form. It may be converted back to lithium iodide, preferably by reacting with lithium in metallic form, for example, and reintroduced into the process. In this way, it does not constitute a waste product which has to be disposed of, but instead can be returned to the method, so that the iodine functions solely as transport medium for lithium.

Alternatively, the transition metal oxide particles may also be converted with a lithium-containing compound, for example lithium carbonate or lithium hydroxide, and a reducing agent selected for example from oxalic acid, formic acid, formaldehyde and derivatives and salts thereof.

The chemical over-lithiation as described above may be conducted in one, two or several separate stages. The material obtained after a first chemical over-lithiation stage preferably undergoes another over-lithiation step (stage 2). Carrying out the over-lithiation in two or more stages advantageously serves to increase the lithium component in the transition metal oxide particles further.

Electrochemical Over-Lithiation (e2)

As an alternative to chemical over-lithiation, the over-lithiation may also be carried out electrochemically. In this context, particularly the transition metal oxide particles obtained in step (d) of the method described above are converted to an over-lithiated material in an electrolyte such as is typically used in lithium-ion batteries. The electrolyte comprises all electrolytes conventionally used in electrochemical cells, particularly in lithium-ion batteries, for example EC:DMC (ethylene carbonat:dimethyl carbonate, typically in a weight ratio of 1:1). The electrolyte further contains a suitable conductive compound, particularly a lithium salt such as for example lithium hexafluorophosphate (LiPF$_6$), wherein this is not to be considered as limiting thereto.

The electrochemical conversion typically takes place with a potential of normally 1.4 V to 4.0 V, preferably from 1.5 V to 3.0 V, particularly preferably from 1.8 to 2.5 V, wherein the transition metal oxide particles are converted to an over-lithiated material by electrochemical means. The lithium ions required for the over-lithiation are provided by the counter electrode and/or a sacrificial electrode.

The conversion to the over-lithiated material then usually takes place through conversion with constant current until the required boundary potential is reached, for example 1.5 V vs. Li/Li$^+$, as previously described, depending on the desired content of additional lithium (value x in general formula (2), as will be described in the following text). The over-lithiation may advantageously be further supported by a subsequent potentiostatic post-lithiation after the boundary potential is reached. If necessary, the conversion to the over-lithiated material may also be preceded by an activation with partial or complete delithiation of the material. This process may also be carried out electrochemically.

Over-Lithiated Transition Metal Oxide Particles

The particle morphology described for the transition metal oxide particles is also preserved in the over-lithiated particles, these also having a spherical or spheroid morphology with high tamped density, as was described previously for the transition metal oxide particles, wherein the tamped density may even be increased further. Moreover, the over-lithiated particles are characterized by strong electrochemical activity.

The present invention thus also relates to over-lithiated transition metal oxide particles having general formula (2) which are producible by the method according to the invention.

In particular, transition metal oxide particles are obtained by the method described previously having general formula (2):

$$Li_{1+x}Mn_{1.5+y}Ni_{0.5-y-z}M_zO_4 \qquad (2),$$

wherein x is a value from 0<x<1.5,

M is particularly selected from one or more of the elements Co, Mg, Fe and Zn, and also optionally Al, V, Cr, Ti, Cu, Be, Ca, Sr, Ba and La, y is a value from 0 to less than 0.5, z is a value from 0 to 0.1, and (y+z) is a value less than 0.5. In a preferred embodiment, y is a value from 0 to 0.2, particularly preferably a value from 0 to 0.1.

The over-lithiated particles according to the invention typically have an average particle size from 1 bis 40 μm, preferably 2 to 30 μm.

The average size of the primary crystallites of the over-lithiated particles according to the invention is typically from 10 to 1000 nm, preferably from 20 to 200 nm.

In particular, the ratio between particle size and primary crystallite is typically between 1000:1 and 20:1, particularly between 100:1 and 40:1.

Surprisingly, it was found that with the method according to the invention as described previously it is possible to obtain over-lithiated transition metal oxide particles with high tamped density, particularly with a tamped density of 2.2 g/cm$^3$ or higher, for example 2.3 g/cm$^3$, 2.4 g/cm$^3$, 2.3 g/cm$^3$ or higher. The tamped density of the particles according to the invention is typically in the range from 2.3 to 3.0 g/cm$^3$, particularly from 2.4 to 2.8 g/cm$^3$.

In particular, the particles have a spherical or spheroid grain shape, wherein the ratio of the largest diameter to the smallest diameter of a particle is 1.8 or less, particularly 1.4 or less, preferably 1.2 or less, particularly preferably 1.1 or less.

User of the (Over-Lithiated) Transition Metal Oxide Particles According to the Invention Both the transition metal oxide particles according to the invention with general formula (1) and the over-lithiated form thereof having general formula (2) lend themselves particularly well to use as electrode material, for example as cathode material, particularly in lithium batteries such as for example in lithium-ion secondary batteries because of their strong electrochemical activity.

The over-lithiated transition metal oxide particles according to the invention are also ideally suitable for use as storage material in lithium secondary batteries or as an additive in cathode materials or anode materials. In this way, it is possible to compensate for irreversible starting losses particularly during the use of high-capacitance electrodes. Particularly when the over-lithiated particles are used as electrode material a high capacitance and high cycle stability may be achieved.

EXAMPLES

Measuring Methods
Determination of Bulk Density and Tamped Density

The tap density (synonymous: tamped density) was determined using a tamping volumeter (STAV 2003, J. Engelsmann AG) in accordance with the manufacturer's instructions. For this, the powder-form sample was poured into a measuring cylinder and its mass was determined by weighing. The bulk density was first determined from the quotient of mass and volume before starting the compaction. The filled cylinder was then mounted in a tamping volumeter (STAV 2003, J. Engelsmann AG) in which it was tamped 1500 times under constant conditions. The quotient of the sample mass and the sample volume after 1500 tamping operations was used as the tamped density. A 100 ml measuring cylinder was used, the bulk volume was 100 ml.
Determination of Primary Crystallite Size The diameter of primary crystallites of the particles was determined using the Pawley method on the basis of the reflex widths of an x-ray diffraction diagram.
Determination of Particle Size and Particle Size Distribution The particle size and particle size distribution (D10, D50, D90) was determined by laser diffraction measurement. Unless otherwise indicated, all size measurements refer to the particle diameter. The D50 indicates the average particle size. D50 means that 50% of the particles are smaller than the indicated value. Similarly, D10 and D90 indicate that 10% and 90% respectively of the particles are smaller than the indicated value.
Determination of Particle Morphology The particle morphology was determined using X-ray electron microscope images of the particles. For this operation, the particles were projected onto a plane and the smallest and largest diameters of the particles in the projection were determined.

Example 1 a) Production of the Lithium-Free Transition Metal Precursor

Production was carried out in a continuously operating stirred reactor. For this, three different solutions (metal salt, caustic solution, $NH_3$) were introduced simultaneously with a constant volume flow rate into a reactor filled with demineralised water, where they were stirred vigorously. The metal salt and caustic solution reacted together, forming an insoluble precipitate. At the same time as the addition, a corresponding volume of the suspension formed was discharged from the reactor area via an overflow. After 6 dwell times, a stable equilibrium was established in the reactor, sampling was begun. The reaction conditions were as indicated in Table 1.

The suspension was collected and then filtered through a suction strainer. The solid material was separated from the mother liquor and subsequently washed with demineralised water until neutral salts were removed. The mother liquor was analysed chemically and the concentrations of $NH_4$, $NH_3$ and OH were determined. The concentrations determined as listed in Table 2.

The solid material was then dried at a temperature of 100° C. The dried powder was analysed for tamped density, morphology and chemical composition, as shown in Table 3.

Figure 2:
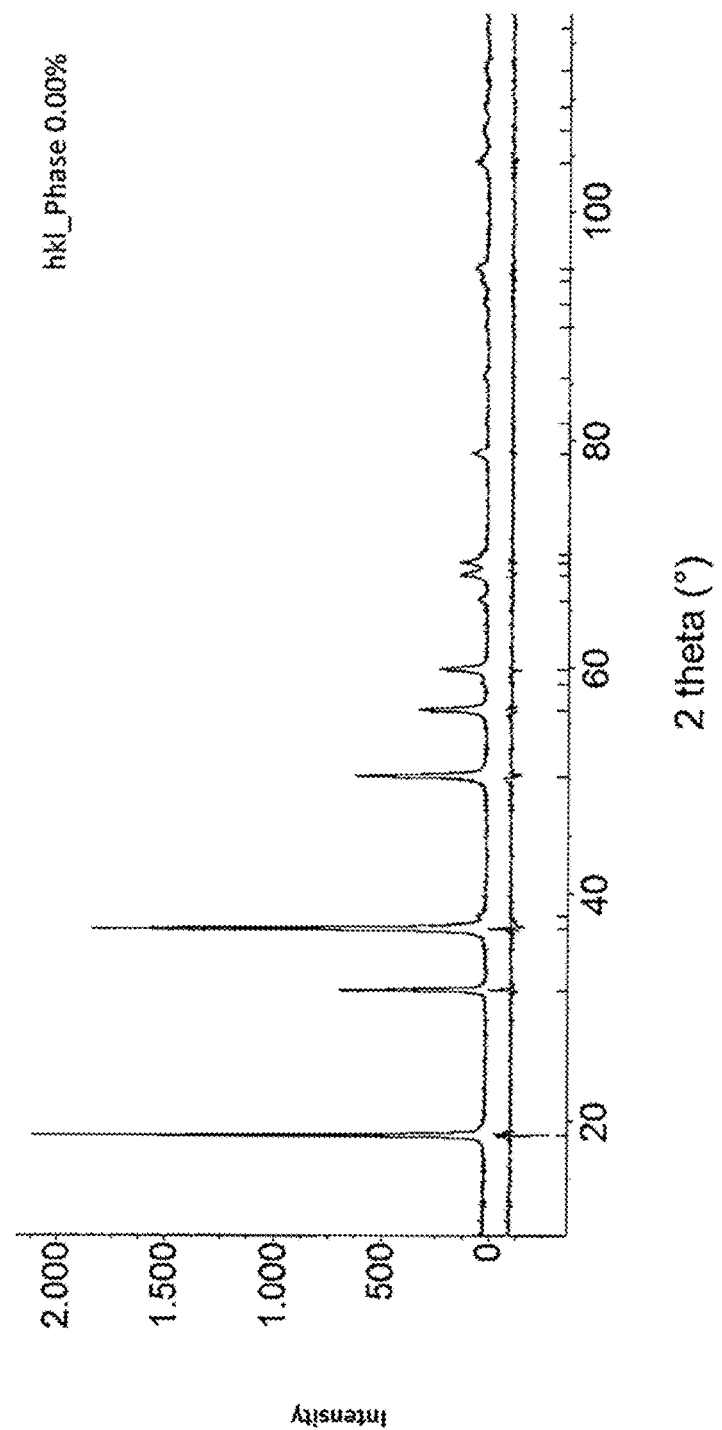
FIG. 2: X-ray diffraction diagram of a lithium-free transition metal precursor according to the invention.

FIG. 2 shows the x-ray diffraction image of a lithium-free precursor with composition Ni:Mn=1:3 according to the invention after processing in nitrogen and drying at 120° C. The brucite structure is evident, space group P-3m1, lattice parameter a=3.2715 A, c=4.7239 A, crystallite size LfullB=110 nm.

b) Production of Lithium-Nickel-Manganese Transition Metal Oxide Particles (Product I)

Production was carried out by mixing the precursor obtained in a) with a lithium hydroxide solution and evaporating the suspension to dryness. The quantity of lithium hydroxide solution was selected such that the atomic ratio of Li:(Mn+Ni)=0.5. Except where otherwise indicated, the dry mixture of precursor and LiOH then underwent precalcining for 3 h at 300° C. followed by final calcining for 12 h at 700° C.

The transition metal particles obtained were analysed for tamped density, morphology and chemical composition, as listed in Table 3.

c) Production of Over-Lithiated Transition Metal Oxide Particles (Product 2)

5 g of the lithium-containing transition metal oxide particles obtained in b) were mixed with 6 g LiI and added to a glass tube with base frit. Dry argon was flushed through the sample through the base frit. Stoichiometric quantities of LiI were used, so that complete conversion took place. The reaction was carried with no moisture present because LiI is hygroscopic. Oxygen was also excluded. The vessel and gas feed line were heated to temperatures between 150° C. and 200° C. by means of an oil bath. The gas-phase elementary iodine $I_2$ formed during the conversion was driven out by flushing with argon. The iodine was crystallised as a solid in a cooling device and thus recovered in highly pure form. Typical reaction times were between 30 minutes and 2 hours. The product obtained was free of byproducts.

Examples 2 to 4

The lithium-free transition metal precursor and the lithium-nickel-manganese transition metal oxide particles were produced in the same way as described for Example 1, wherein the reaction conditions were selected as described in Table 1. The concentrations of NaOH, $NH_4^+$ and $NH_3$ calculated from the mother liquor are listed in Table 2.

The transition metal particles obtained were analysed for tamped density, morphology and chemical composition, as listed in Table 3.

Comparison Examples 1 and 2

The lithium-free transition metal precursor and the lithium-nickel-manganese transition metal oxide particles were produced in the same way as described for Example 1, wherein the reaction conditions were selected as described in Table 1. The concentrations of NaOH, $NH_4^+$ and $NH_3$ calculated from the mother liquor are listed in Table 2. The transition metal particles obtained were analysed for tamped density, morphology and chemical composition, as listed in Table 3.

TABLE 1a

Reactants added

| | $Ni(NO_3)_2$/ $Mn(NO_3)_2$ (0.25/0.75 [mol/mol]) | | NaOH | | $NH_3$ | |
|---|---|---|---|---|---|---|
| | Volume flow rate [ml/h] | Total metal concentration | Volume flow rate [ml/h] | Total metal concentration | Volume flow rate [ml/h] | Total metal concentration |
| Example 1 | 186.7 | 4.228 | 452.8 | 3.001 | 35.5 | 7.91 |
| Example 2 | 121.7 | 4.451 | 288.33 | 3.630 | 40.0 | 4.69 |
| Example 3 | 230.5 | 3.802 | 388.2 | 3.729 | 56.4 | 9.44 |
| Example 4 | 220.8 | 3.652 | 386.3 | 3.747 | 68.0 | 7.91 |
| Comparison example 1 | 110.2 | 4.451 | 533.8 | 1.908 | 31.0 | 9.1 |
| Comparison example 2 | 165.3 | 4.451 | 478.7 | 3.024 | 31.0 | 9.1 |

| | Reactants added [mol/h] | | | Addition ratios [molar ratio] | | |
|---|---|---|---|---|---|---|
| | M(II) | $OH^-$ | $NH_3$ | OH:M | $NH_3$:M | $NH_3$:OH |
| Example 1 | 0.79 | 1.36 | 0.28 | 1.72 | 0.36 | 0.26 |
| Example 2 | 0.54 | 1.05 | 0.19 | 1.94 | 0.35 | 0.33 |
| Example 3 | 0.88 | 1.45 | 0.53 | 1.65 | 0.61 | 0.42 |
| Example 4 | 0.81 | 1.45 | 0.54 | 1.80 | 0.67 | 0.46 |
| Comparison example 1 | 0.49 | 1.02 | 0.28 | 2.08 | 0.58 | 0.56 |
| Comparison example 2 | 0.74 | 1.45 | 0.28 | 1.97 | 0.38 | 0.26 |

TABLE 1b

Reaction parameters

| | Temperature [° C.] | Stirrer speed [rpm] | Dwell time [h] | Time until sampling [h] | Solid content [wt %] |
|---|---|---|---|---|---|
| Example 1 | 60 | 900 | 2 | 12 | 10.5 |
| Example 2 | 49 | 900 | 3 | 18 | 10.8 |
| Example 3 | 60 | 900 | 2 | 12 | 11.7 |
| Example 4 | 65 | 900 | 2 | 12 | 10.9 |
| Comparison example 1 | 60 | 900 | 2 | 12 | 6.5 |
| Comparison example 2 | 60 | 900 | 2 | 12 | 9.6 |

TABLE 2

Concentration of $NH_4^+$ and $NH_3$ in the filtrate

| | c $NH_3$ [mol/l] | c $NH_4^+$ [mol/l] | c $OH^-$ mol/l |
|---|---|---|---|
| Example 1 | 0.137 | 0.158 | — |
| Example 2 | 0.355 | 0.049 | — |
| Example 3 | 0.500 | 0.184 | — |
| Example 4 | 0.017 | 0.124 | — |
| Comparison example 1 | 0.364 | — | 0.075 |
| Comparison example 2 | 0.294 | 0.021 | — |

TABLE 3a

Chemical composition of the lithium-free transition metal precursor

| | Li [wt %] | Mn [wt %] | Ni [wt %] | Na [wt %] |
|---|---|---|---|---|
| Example 1 | 0 | 49.46 | 17.41 | <0.02 |
| Example 2 | 0 | 49.05 | 17.54 | <0.02 |
| Example 3 | 0 | 48.42 | 17.73 | <0.02 |
| Example 4 | 0 | 49.52 | 15.87 | <0.02 |
| Comparison example 1 | Not determined due to low tamped density and lack of sphericity | | | |
| Comparison example 2 | Not determined due to low tamped density and lack of sphericity | | | |

TABLE 3b

Chemical composition of the lithium-containing transition metal oxide particles (Product I)

| | Li [wt %] | Mn [wt %] | Ni [wt %] | Na [wt %] |
|---|---|---|---|---|
| Example 1 | 3.84 | 44.32 | 15.78 | <0.02 |
| Example 2 | 3.87 | 46.41 | 16.92 | <0.02 |
| Example 3 | 4.04 | 47.31 | 16.86 | <0.02 |
| Example 4 | 4.02 | 49.42 | 15.48 | <0.02 |

TABLE 3c

Chemical composition of the lithium-containing transition metal oxide particles (Product II)

| | Li [wt %] | Mn [wt %] | Ni [wt %] | Na [wt %] |
|---|---|---|---|---|
| Example 1 | 7.69 | 45.09 | 15.81 | <0.02 |
| Example 2 | n.d. | n.d. | n.d. | <0.02 |
| Example 3 | n.d. | n.d. | n.d. | <0.02 |
| Example 4 | n.d. | n.d. | n.d. | <0.02 | n.d. = not determined

TABLE 4

Particle morphology

| | Version | D10 [μm] | D50 [μm] | D90 [μm] | Morphology | Tamped density [g/cm$^3$] |
|---|---|---|---|---|---|---|
| Example 1 | Precursor 1 | 7.7 | 15.2 | 27.8 | spherical | 2.03 |
| | Product 1 | n.d. | n.d. | n.d. | spherical | 2.45 |
| | Product II | n.d. | n.d. | n.d. | spherical | 2.46 |

TABLE 4-continued

Particle morphology

| | Version | D10 [μm] | D50 [μm] | D90 [μm] | Morphology | Tamped density [g/cm³] |
|---|---|---|---|---|---|---|
| Example 2 | Precursor 1 | 6.4 | 13.0 | 26.4 | spherical | 2.07 |
| Example 3 | Precursor 1 | 7.6 | 14.5 | 25.4 | spherical | 2.00 |
| | Product 1 | 7.4 | 14.4 | 26.5 | spherical | 2.28 |
| Example 4 | Precursor 1 | n.d. | n.d. | n.d. | spherical | 2.01 |
| | Product 1 | 8.6 | 22.2 | 42.7 | spherical | 2.51 |
| Comparison example 1 | Precursor 1 | 0.6 | 6.0 | 44.1 | irregular | 1.3 |
| Comparison example 2 | Precursor 1 | 6.0 | 11.1 | 18.9 | partly agglomerated | 1.34 | n.d. = not determined

An overview of the particle morphologies obtained as a function of the concentrations of $NH_3$ and $NH_4^+$ determined in the mother liquor during precipitation is presented in FIG. 6.

It was demonstrated that when a $NH_4^+$ concentration of 0.05 mol/l was adjusted in the mother liquor during the precipitation reaction, particles could be obtained which have a spherical morphology and high tamped density at the same time. In contrast to this, in comparison example 1, in which over-stoichiometric NaOH was used, that is to say OH ions remained in the mother liquor, irregularly formed particles with low tamped density were obtained. In comparison example 2, in which the $NH_4^+$ concentration was lower than 0.05 mol/l, partially agglomerated, non-spherical particles with low tamped density were obtained.

Example 5

A transition metal oxide prepared according to Example 1 was reacted with various quantities of LiI. It was possible to adjust the lithium content (1+x) in $Li_{1+x}M_2O_4$ in the method described for Example 1 very effectively with the aid of the quantity of lithium iodide used. Products after conversion with LiI were found in the x-ray diffraction diagram to still have shoulders in the reflex pattern, which are particularly marked on the main reflex at 18°=2 theta.

Figure 8:
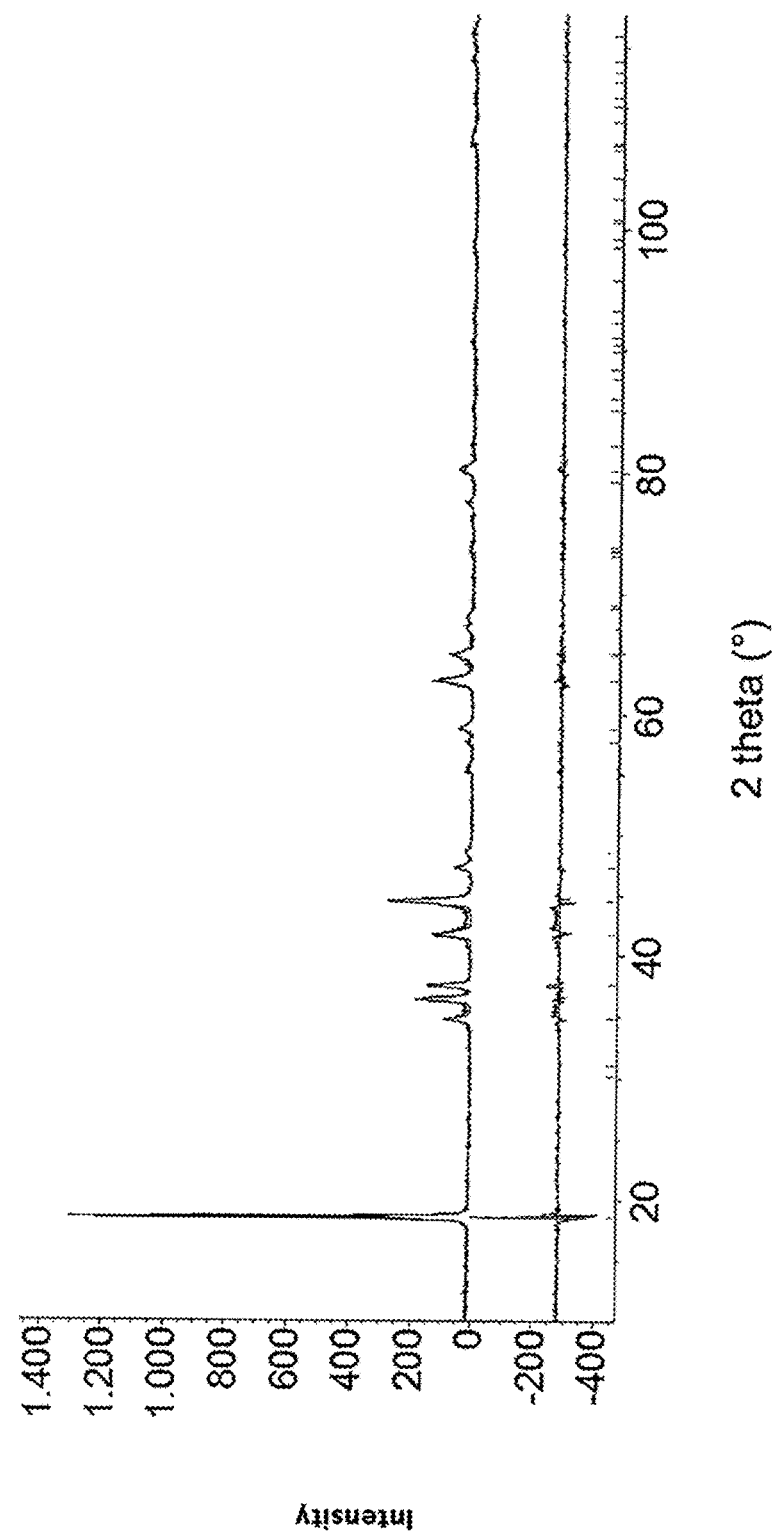
FIG. 8: X-ray diffraction diagram of the over-lithiated phase-pure product obtained in Example 1.

The crystal structures were determined by x-ray diffraction and are shown in Table 5. Microscopic images of the particles of the over-lithiated product obtained in Example 1 with a tamped density of 2.46 are shown in FIG. 7. The corresponding diffraction diagram of the phase pure $Li_2Ni_{0.5}Mn_{1.5}O_4$ with the space group 141/amd is shown in FIG. 8.

Example 6: Effect of the Calcining Temperature on Crystallite Size

Transition metal oxide particles were produced according to the method described in Example 1 and calcined at various temperatures and for various periods as described in the following section. The effect of the calcining temperature on the crystallite size of the particles was determined by x-ray diffraction.

FIG. 2 shows the x-ray diffraction diagram of transition metal oxide particles according to the invention following calcining for 3 h at 350° C. When the diffraction diagram is examined using the Pawley method, the reflex widths reveal a primary crystallite size of the spinels of L Vol IB=15-20 nm. The x-ray diffraction image shows phase-pure LNMS.

Figure 3:
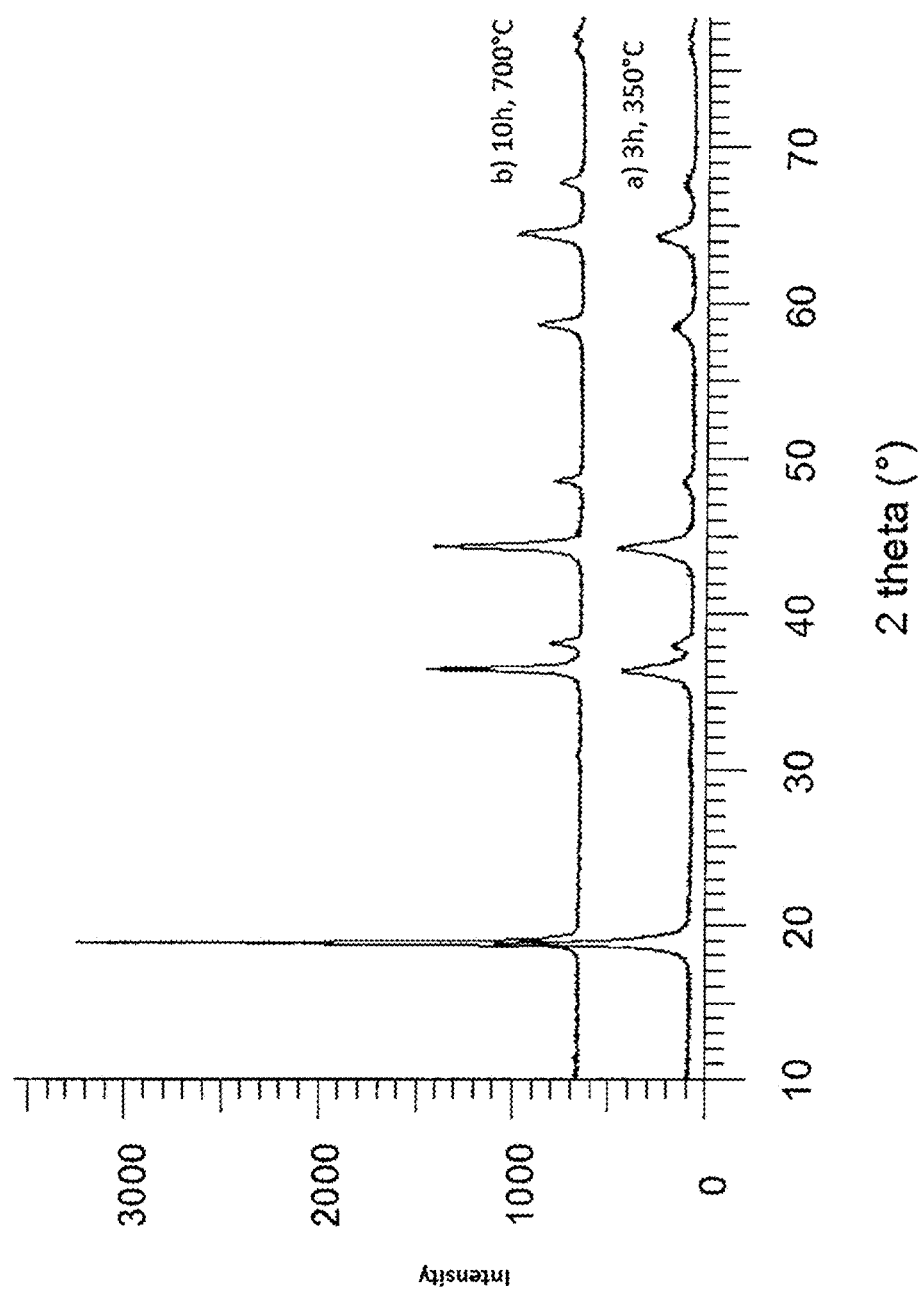
FIG. 3: X-ray diffraction diagram of lithium-containing transition metal oxide particles according to the invention after calcining for 3 h at 350° C. and after calcining for 10 h at 700° C.

FIG. 3 shows the diffraction diagram of one sample according to the invention which was calcined for 3 h at 350° C. and one sample which was calcined for 10 h at 700° C. Compared with a sample which was reacted at a lower temperature, the reflex half-widths after calcining at a higher temperature are narrower, indicated crystallite growth. The crystallite size according to the Pawley method returns values of 100-200 nm.

Figure 4:
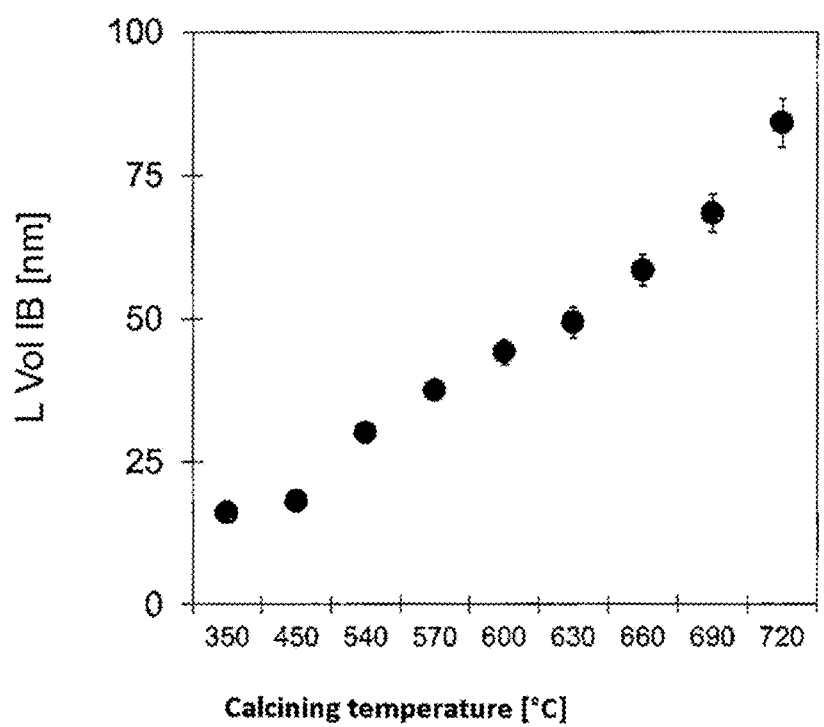
FIG. 4: Controllability of the crystallite size by influencing the calcining temperature.
Figure 5:
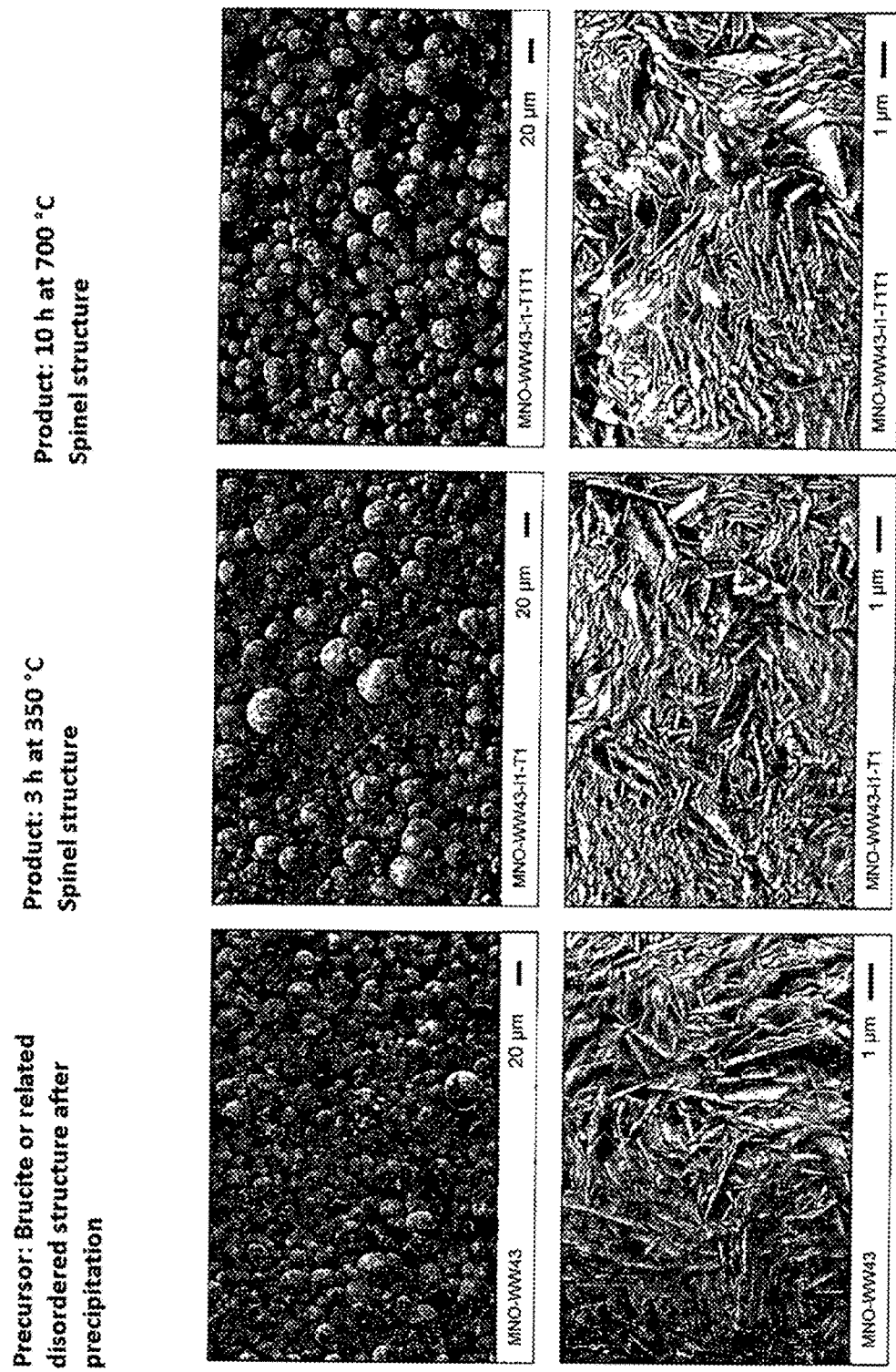
FIG. 5: Grain shape distribution and distribution of crystallite shapes of transition metal oxide particles produced according to the invention.

The controllability of the crystallite size under the influence of the calcining temperature is shown in FIG. 4. FIG. 5 shows that the special grain structure due to the thermal conversion undergoes no changes.

Example 7: Characterisation of the Electrochemical Behaviour of Transition Metal Oxide Particles According to the Invention (Product 1)

Lithium-nickel-manganese transition metal oxide particles with composition $Li_1Ni_{0.5}Mn_{1.5}O_4$ were produced as described in Example 1 and their electrochemical behaviour was determined.

The electrochemical behaviour of the particles was analysed using electrodes that were coated on industrial machines and which also have technically typical electrode coverings of 15 mg/cm² and more. Cyclisation was carried out in half-cell geometry in button cells produced by MTI against metallic lithium. A GFA glass fibre layer from Whatman was used as the separator, the electrolyte was EC:DMC (1:1) with 1 M $LiPF_6$ as the conductor salt. Cyclisation was carried out between various potential boundaries with a charging switch-off voltage of 4.9 V and discharging switch-off voltages or 3.5 V, 2.4 V, 1.9 V and 1.5 V vs. Li/Li⁺. All samples were charged at 0.5 C. A load test with discharge rates of C/2 to 5 C is shown for the working

| Composition from ICP | Phases | Space group | Symmetry | Lattice parameter [Å] a | Lattice parameter [Å] c | Cell volume [Å³] | Crystal size [nm] L Vol IB |
|---|---|---|---|---|---|---|---|
| $Li_{1.74}Ni_{0.50}Mn_{1.50}O_4$ | L2MNS | 141/amd | Tetragonal | 5.7529 | 8.6376 | 285.88 | 102 |
| | LMNS | Fd-3m | Cubic | 8.1754 | | 546.62 | 95 |
| $Li_{1.98}Ni_{0.49}Mn_{1.51}O_4$ | L2MNS | 141/amd | Tetragonal | 5.7469 | 8.6345 | 285.17 | 110 |
| $Li_{2.01}Ni_{0.49}Mn_{1.51}O_4$ | L2MNS | 141/amd | Tetragonal | 5.7484 | 8.6399 | 285.50 | 99 |
| $Li_{2.03}Ni_{0.50}Mn_{1.50}O_4$ | L2MNS | 141/amd | Tetragonal | 5.7466 | 8.6496 | 285.34 | 95 |

Figure 9:
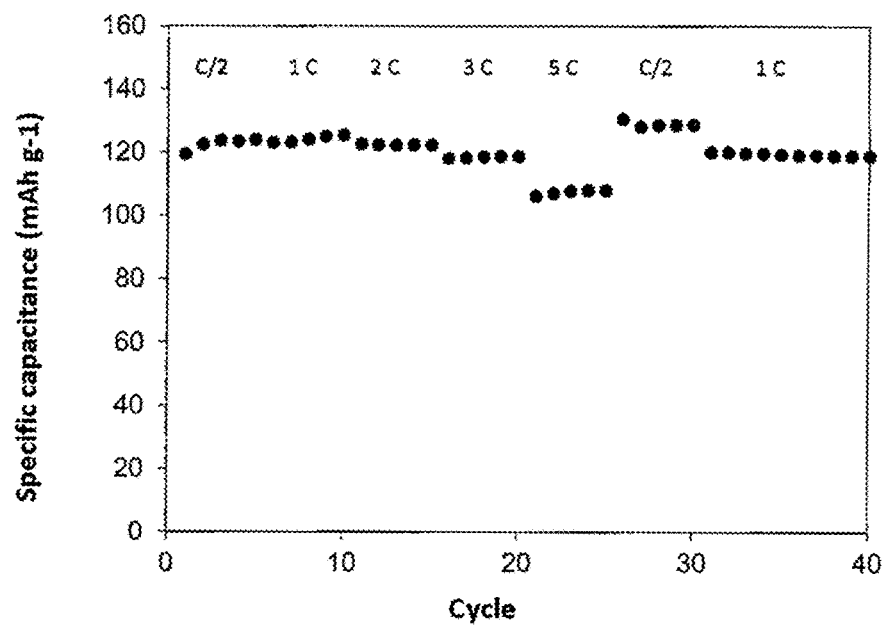
FIG. 9: Electrochemical stability and load behaviour of an electrode coil-coated with transition metal oxide particles produced according to the invention.

It was thus demonstrated that the advantageous spherical particle morphology of the particles according to the invention also remains preserved after over-lithiation.

range 3.5-4.9 V vs. Li/Li⁺, wherein the C-rate is relative to the theoretical charging capacitance of $LiNi_{0.5}Mn_{1.5}O_4$, see FIG. 9. The load-bearing capability and cycle stability of the materials according to the invention are excellent even with high electrode coatings, as is shown here for 15 mg/cm$^2$ LiNi$_{0.5}$Mn$_{1.5}$O$_4$.

This working range corresponds to the 4.7 V working level of the material. In the working range 4.9-3.5 V, about 120 mAh/g are used. The load-bearing capability is also very high with 5 C.

Example 8: Characterisation of the Electrochemical Behaviour of Over-Lithiated Transition Metal Oxide Particles According to the Invention (Product 2)

Over-lithiated lithium-nickel-manganese transition metal oxide particles with composition Li$_{1.6}$Ni$_{0.5}$Mn$_{1.5}$O$_4$ were prepared as described in Example 1, and their electrochemical behaviour was analysed.

Figure 10:
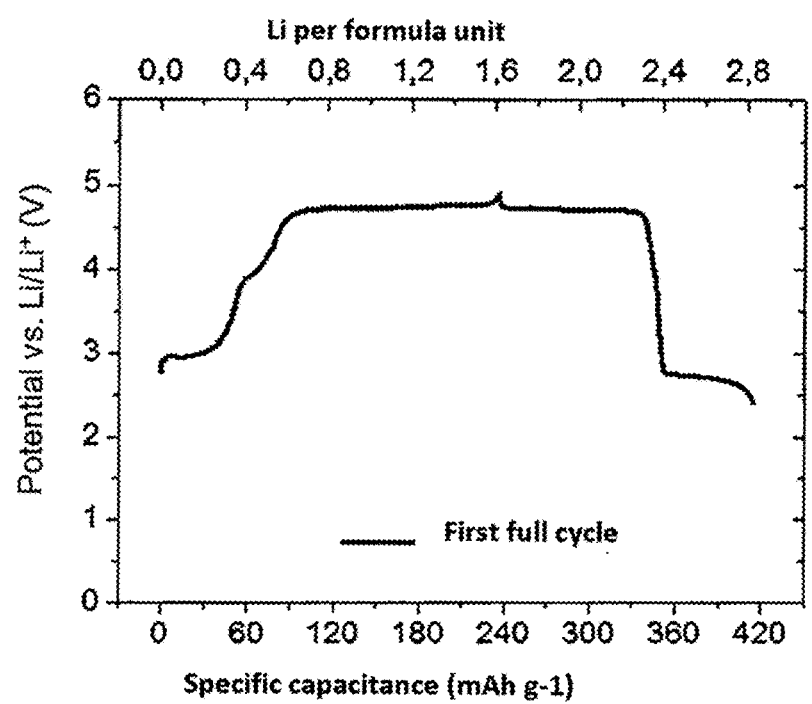
FIG. 10: Potential curves of the $Li_{1+x}Ni_{0.5}Mn_{1.5}O_4$ used in over-lithiated form, first full cycle using both potential steps.
Figure 11:
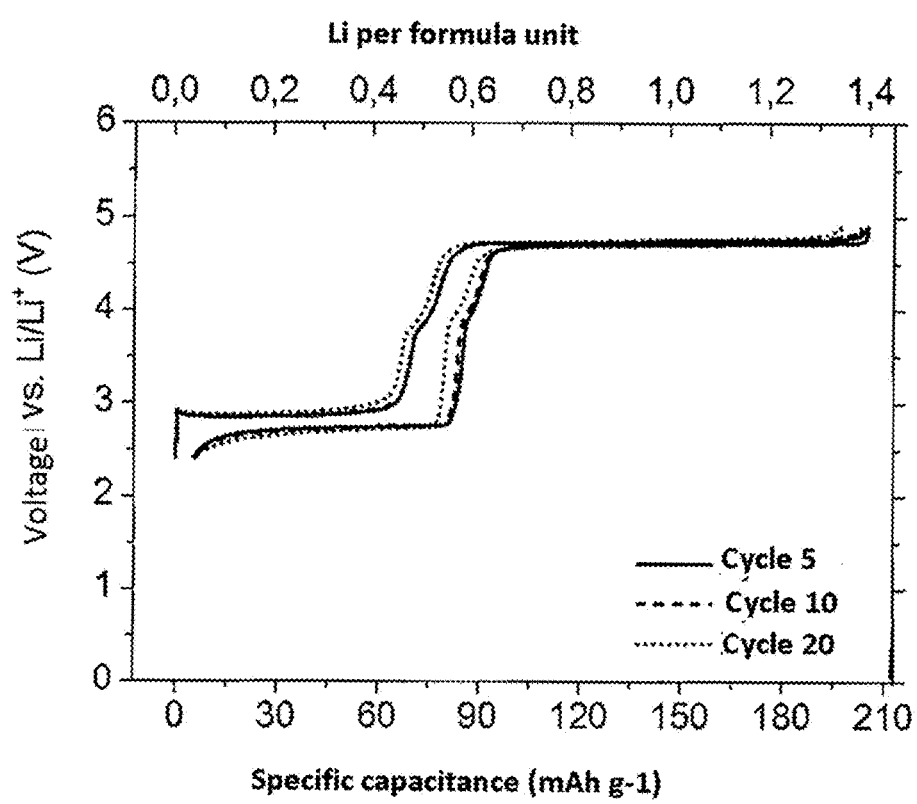
FIG. 11: Potential curves of full cycles 5, 10 and 20 of the $Li_{1+x}Ni_{0.5}Mn_{1.5}O_4$ used in over-lithiated form.
Figure 12:
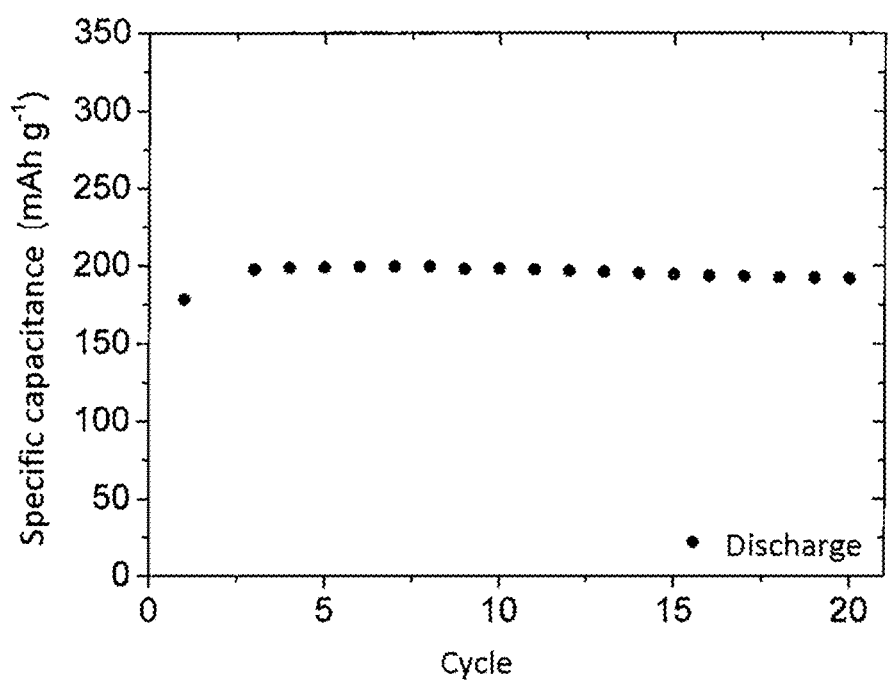
FIG. 12: Cycle behaviour of the $Li_{1+x}Ni_{0.5}Mn_{1.5}O_4$ used in chemically over-lithiated form.

The electrochemical behaviour of the material obtained is represented in FIGS. 10 to 12. The images show that the specific capacitance of the materials according to the invention is significantly greater than that of lithium-rich layer oxides in commercial use. The potential curves show stable behaviour and high cycle stability with low hysteresis between the charging and discharging curve, which suggests rapid kinetics. In this form, the over-lithiated material may be installed directly opposite an uncharged anode.

Example 9: Characterisation of the Electrochemical Behaviour of Electrochemically Produced Over-Lithiated Transition Metal Oxide Particles (Product 2)

Figure 13:
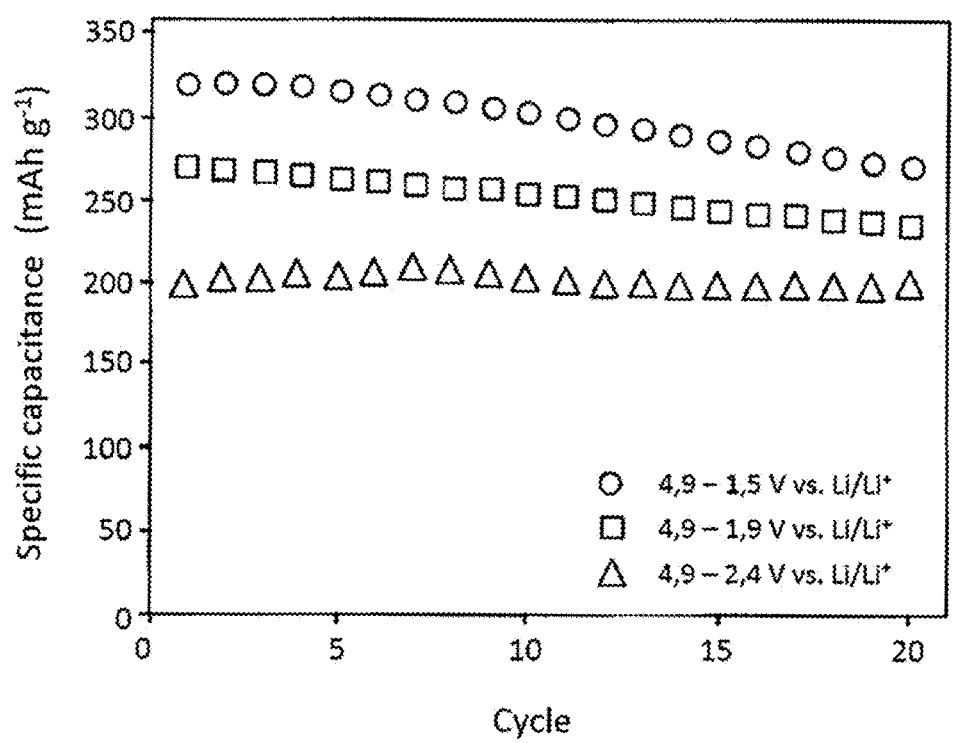
FIG. 13: Specific capacitance of an over-lithiated material according to the invention after electrochemical over-lithiation.

Lithium-nickel-manganese transition metal oxide particles were produced as described in Example 1 and then converted into an over-lithiated product electrochemically. For this, the transition metal oxide particles were converted into a lithium-rich material at potentials of 2.4 V, 1.9 V and 1.5 V vs. Li/Li$^+$ in the electrolyte as the electrode, and the electrochemical behaviour of the over-lithiated material obtained thereby was analysed (FIG. 13). From the values obtained for the specific capacitance of 200 mAh/g (at 2.4 V), 270 mAh/g (at 1.9 V) and 320 mAh/g (at 1.5 V), the composition of the corresponding over-lithiated products for Li$_{2.18}$Ni$_{0.5}$Mn$_{1.5}$O$_4$, Li$_{1.84}$Ni$_{0.5}$Mn$_{1.5}$O$_4$ and Li$_{1.36}$Ni$_{0.5}$Mn$_{1.5}$O$_4$ may be determined.

If the material obtained is cyclised in the working range 4.9-2.4 V vs. Li/Li$^+$ more than 200 mAh/g are used reversibly with high stability. This is already significantly greater than the specific capacitance of the NCA layer oxide in commercial use, with 180 mAh/g. Cyclising in the working range of 4.9-1.9 V vs. Li/Li enables the use of maximum values for specific capacitance of 270 mAh/g. This is already greater than the high capacitance values of lithium-rich layer oxides. If cyclisation is continued in the working range from 4.9-1.5 V vs. Li/Li$^+$ up to 320 mAh/g is achievable. The material according to the invention may thus be used as a high-capacitance cathode material in full cells, in both the over-lithiated and the non-over-lithiated forms.

Example 10: Use of the Material Li$_{1.6}$Ni$_{0.5}$Mn$_{1.5}$O$_4$ Over-Lithiated According to the Invention as Additive in Cathodes for Application in Full Cells If it is only intended to use the transition metal oxide particles according to the invention (product 1) electrochemically on the high-voltage plateau, an over-lithiated material (product 2) may advantageously also be used as an additive to compensate for the irreversible loss of the anode during starting. If the use of the material in high energy cells is limited solely to the high-voltage range, only a part of the possible specific capacitance is used, which corresponds at the cell level to low energy density. But the high potential can be used advantageously on the module level: the high cell potential means that fewer single cells have to be connected in the module in order to achieve the desired total voltage. This results in the recovery of more energy density at the system level. This variant is particularly helpful when high-capacitance anodes are used. They typically manifest substantial irreversible starting loss.

In the full cell, the lithium stocks of the cathode and the anode are coupled to each other. If lithium is lost irreversibly on the one side, usually from the anode, that lithium is no longer available for the electrochemical redox process. The active material on the positive electrode will therefore no longer be fully re-lithiated, it can only be used partially. This means increased material consumption and higher costs for the cathode and lower capacitance for the cell. If it is possible to compensate for the irreversible charging losses at the anode, the cathode material can be used fully.

If it is only intended to use the 4.7 V plateau of the material according to the invention, over-lithiated Li$_{1+x}$[Ni$_{0.5}$Mn$_{1.5}$]O$_4$ may be used as an additive. In the first charging operation, x lithium of the additive is exserted on a 3 V plateau and 1 lithium is exserted on the 4.7 V plateau. If the charging value from x is equated to the irreversible charging loss at the anode, subsequently the full high-voltage plateau can be used. This is particularly significant for anode materials such as silicon and composites thereof, and amorphous carbons: the specific capacitance values thereof are higher than those of typical graphites, but at the same time they have a high irreversible starting capacitance.

Figure 14:
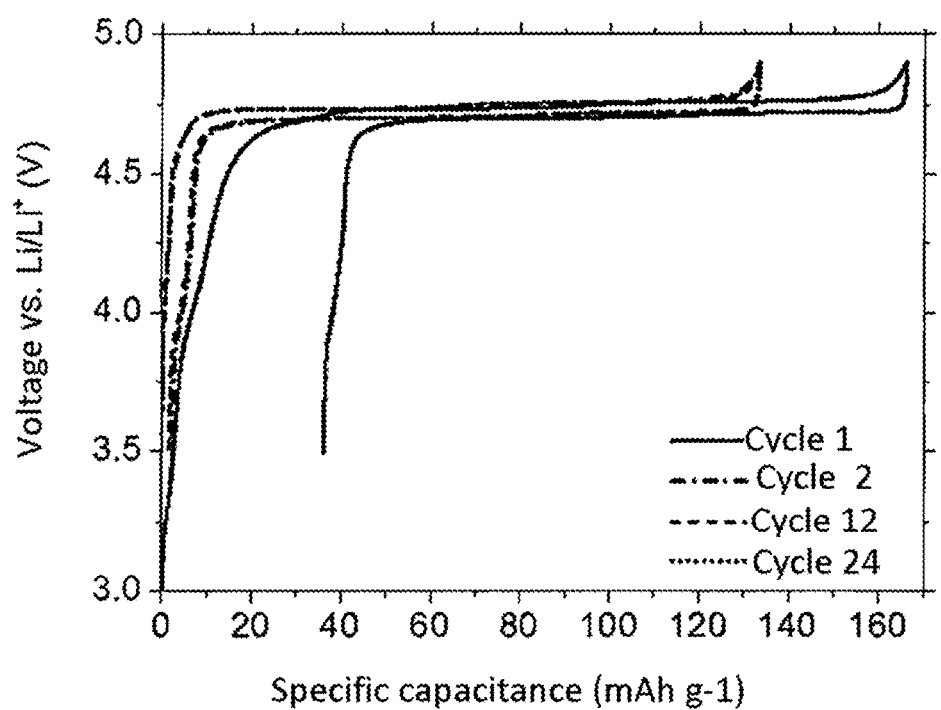
FIG. 14: Potential curves during use of the over-lithiated material according to the invention as electrode additive for electrode composite in the half cell.
Figure 15:
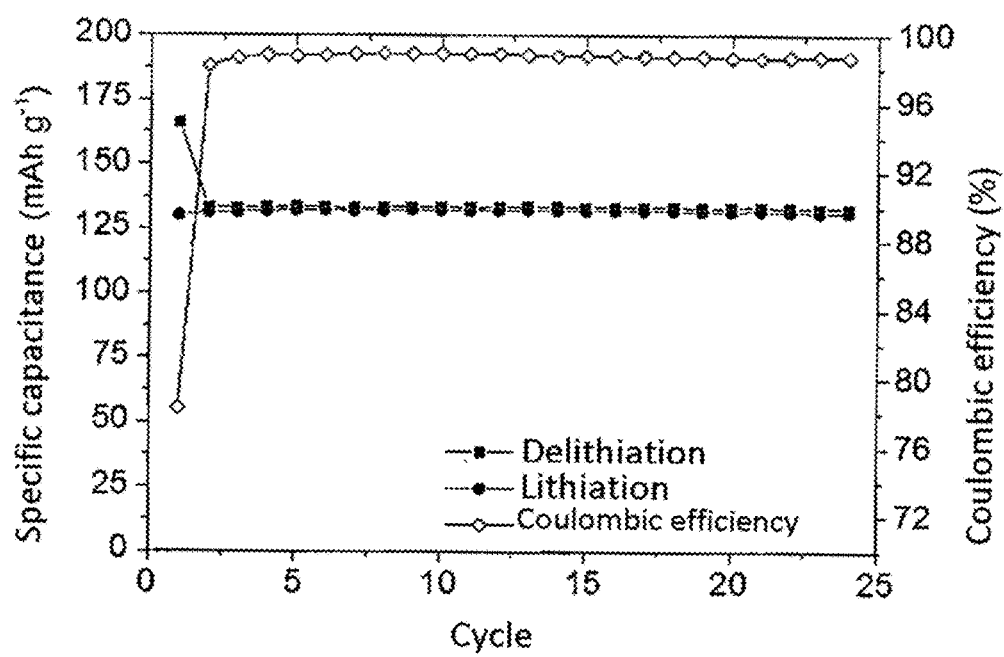
FIG. 15: Cycle behaviour of the electrode composite in the half cell.

The use of an over-lithiated powder according to the invention is shown in FIGS. 14 and 15. The composition of the electrode composite was 90 wt % active mass and 4% binding agent and 6% conductive additive. In order to compensate for the irreversible losses at the negative electrode an over-lithiated Li$_{1.6}$[Ni$_{0.5}$Mn$_{1.5}$]O$_4$ (product 2 from example 1), which can contribute an additional 0.6 lithium per formula unit electrochemically, was mixed with the Li$_{1.0}$[Ni$_{0.5}$Mn$_{1.5}$]O$_4$ (product 1 from example 1). The ratio of the active mass components was selected such that the irreversible charge contribution per surface area supplied at the cathode was exactly equivalent to the irreversible loss at the anode.

FIG. 14 shows the potential curves in half-cell geometry. The active material mixture from product 1 and from the over-lithiated product 2 was adjusted to an irreversible charge contribution in the first cycle of 35 mAh/g. This charge contribution compensates exactly for the irreversible loss of the anode used. In order to adjust the contribution, a mixture of 78 wt % Li$_{1.0}$[Ni$_{0.5}$Mn$_{1.5}$]O$_4$ and 22 wt % Li$_{1.6}$[Ni$_{0.5}$Mn$_{1.5}$]O$_4$ was needed. The reversible charge conversion is 130 mAh/g. First cycle: 35 mAh/g irreversible loss due to targeted use of an over-lithiated material in the electrode composite. FIG. 15 shows the cycle behaviour of the electrode composite in half-cell geometry.

The LMNO-electrode composite electrode described was cyclised against graphite in a full cell structure. Due to the compensation of the irreversible charge loss at the graphite anode by the composite cathode, the full high-voltage plateau with 130 mAh/g LMNO can also be used in the full cell structure.

Cell Data:
Cathode: 15 mg cm$^2$ composite, 160 mAh g$^{-1}$ first charge, 130 mAh g$^{-1}$ in subsequent cycles
Anode: 9 mg cm$^2$ graphite, 310 mAh g$^{-1}$
Balance: 16% surplus in the first cycle
Electrolyte: EC:DMC (1:1 wt %)+1M LiPF$_6$
Ratios must be adapted individually according to the material used (cathode, anode) and the charge contribution required.

Figure 16:
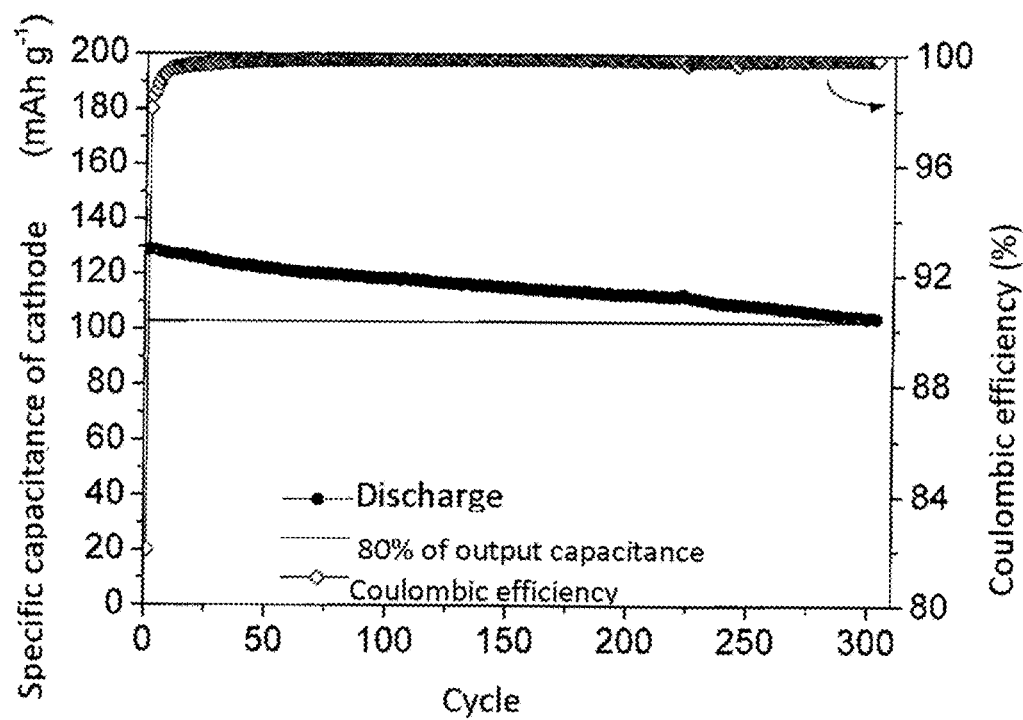
FIG. 16: Compensation for irreversible anode losses through use of the electrode composite in the full cell.

FIG. 16 shows that by compensation of the irreversible anode losses by using the electrode composite according to the invention it is possible to achieve 130 mAh/g LMNO in the full cell as well, which corresponds to the specific reversible capacitance from the half-cell measurements.

The invention claimed is:

1. Method for producing lithium-nickel-manganese based transition metal oxide particles having general formula (1):

$$\text{LiMn}_{1.5+y}\text{Ni}_{0.5-y-z}\text{M}_z\text{O}_4 \qquad (1),$$

wherein M comprises one or more elements from the group of Co, Mg, Fe and Zn,
y is a value from 0 to less than 0.5,
z is a value from 0 to 0.1, and
(y+z) is a value less than 0.5,
the method comprising the steps of:
(a) reacting an aqueous solution of manganese salts, nickel salts and optional one or more further salts of the elements Co, Mg, Fe and Zn with an aqueous solution of an alkali metal hydroxide and NH$_3$ to precipitate a lithium-free transition metal precursor from the reaction mixture,
wherein the concentration of NH$_4^+$ ions in the reaction mixture after establishing a chemical equilibrium is 0.05 mol/l or more,
(b) isolating and optionally drying the precipitated lithium-free transition metal precursor from the reaction mixture,
(c) reacting the lithium-free transition metal precursor with an aqueous solution of a thermally decomposable lithium compound to obtain a lithium-containing transition metal precursor, and
(d) calcining the lithium-containing transition metal precursor at a temperature of 300° C.-800° C.

2. Method according to claim 1, wherein in step (a) the concentration of NH$_3$ in the reaction mixture is 0.01 to 1.0 mol/l after the establishment of a chemical equilibrium.

3. Method according to claim 1, wherein in step (a) the concentration of NH$_4^+$ions in the reaction mixture is 0.07 to 0.25 mol/l after the establishment of a chemical equilibrium.

4. Method according to claim 1, wherein the alkali metal hydroxide in step (a) is sodium hydroxide.

5. Method according to claim 1, wherein the salts in step (a) are selected from nitrates and sulphates.

6. Method according to claim 1, wherein the conversion in step (a) takes place in a continuously operating reactor.

7. Method according to claim 1, wherein the calcining in step (d) takes place in an first stage at a temperature from 350° C. to 450° C. and in a second stage at a temperature from 450° C. to 700° C.

8. Method according to claim 1, further comprising the step
(e1) Mixing the transition metal oxide particles obtained in step (d) with a lithium-containing compound and a reducing agent, and converting the mixture in a solid phase reaction at a temperature from 120° C. to 400° C. to obtain transition metal oxide particles having general formula (2), $$\text{Li}_{1+x}\text{Mn}_{1.5+y}\text{Ni}_{0.5-y-z}\text{M}_z\text{O}_4 \qquad (2),$$

wherein x is a value from 0<x<1.5,
and M, y and z are as defined in claim 1.

9. Method according to claim 8, wherein the conversion in step (e1) is carried out with lithium iodide.

10. Method according to claim 8, wherein the conversion in step (e1) takes place at at temperature from 180° C. to 300° C.

11. Method according to any one of claim 1, further comprising step
(e2) electrochemical conversion of the transition metal oxide particles obtained in step (d) with a lithium-containing counter electrode and/or a lithium containing sacrificial electrode in an electrolyte with a potential from 1.4 to 4.0 V, to obtain transition metal oxide particles having general formula (2), $$\text{Li}_{1+x}\text{Mn}_{1.5+y}\text{Ni}_{0.5-y-z}\text{M}_z\text{O}_4 \qquad (2),$$

wherein x is a value from 0<x<1.5,
and M, y and z are as defined in claim 1.

12. Transition metal oxide particles having general formula (1), obtainable by a method as defined in claim 1, $$\text{LiMn}_{1.5+y}\text{Ni}_{0.5-y-z}\text{M}_z\text{O}_4 \qquad (1),$$

wherein M, y and z are as defined in claim 1,
the particles have an average particle size from 1 to 40 the average primary crystallite size of the particles is from 20 to 1000 nm, the tamped density is from 2.0 to 2.8 g/cm$^3$, and the particles have a spherical or spheroidal grain shape, wherein the ratio of the largest diameter to the smallest diameter of a particle is 1.8 or less.

13. Transition metal oxide particles having general formula (2), obtainable by a method as defined in claim 8, $$\text{Li}_{1+x}\text{Mn}_{1.5+y}\text{Ni}_{0.5-y-z}\text{M}_z\text{O}_4 \qquad (2),$$

wherein M comprises one or more elements from the group of Co, Mg, Fe and Zn,
y is a value from 0 to less than 0.5,
z is a value from 0 to 0.1,
(y+z) is a value less than 0.5, and
x is a value from 0<x<1.5, the particles have an average particle size from 1 to 40 μm, the average primary crystallite size of the particles is from 20 to 1000 nm, the tamped density is from 2.2 to 3.0 g/cm$^3$, and the particles have a spherical or spheroidal grain shape, wherein the ratio of the largest diameter to the smallest diameter of a particle is 1.8 or less.

14. Use of the transition metal oxide particles according to claim 12 as electrode material.

15. Use of the transition metal oxide particles according to claim 13 as storage material in lithium accumulators or as an additive in anode materials.

* * * * *